(12) United States Patent
Passey et al.

(10) Patent No.: US 12,174,814 B2
(45) Date of Patent: Dec. 24, 2024

(54) AGGREGATES INDEX

(71) Applicant: Dropbox, Inc., San Francisco, CA (US)

(72) Inventors: Aaron Passey, San Francisco, CA (US); Braden Walker, San Francisco, CA (US); Akos Albert, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/129,292

(22) Filed: Dec. 21, 2020

(65) Prior Publication Data
US 2022/0197883 A1 Jun. 23, 2022

(51) Int. Cl.
G06F 16/22 (2019.01)
G06F 16/23 (2019.01)

(52) U.S. Cl.
CPC ...... G06F 16/2272 (2019.01); G06F 16/2379 (2019.01)

(58) Field of Classification Search
CPC ............... G06F 16/2272; G06F 16/2379
USPC ................................................ 707/696
See application file for complete search history.

(56) References Cited

U.S. PATENT DOCUMENTS

| | | | |
|---|---|---|---|
| 5,560,005 A * | 9/1996 | Hoover | G06F 16/27 |
| 5,729,734 A | 3/1998 | Parker et al. | |
| 5,857,197 A * | 1/1999 | Mullins | G06F 16/289 707/999.102 |
| 5,983,241 A | 11/1999 | Hoshino | |
| 6,308,181 B1 | 10/2001 | Jarvis | |
| 6,438,549 B1 | 8/2002 | Aldred et al. | |
| 6,487,546 B1 * | 11/2002 | Witkowski | G06F 16/284 |
| 6,823,338 B1 | 11/2004 | Byrne et al. | |
| 7,779,265 B2 | 8/2010 | Dubhashi et al. | |
| 7,917,940 B2 | 3/2011 | Holdsworth et al. | |
| 7,937,421 B2 | 5/2011 | Mikesell et al. | |

(Continued)

FOREIGN PATENT DOCUMENTS

| | | |
|---|---|---|
| CN | 104919414 B | 4/2018 |
| JP | H06290095 A | 10/1994 |

(Continued)

OTHER PUBLICATIONS

International Search Report and Written Opinion for Application No. PCT/US2021/040914 dated Mar. 3, 2022, 15 pages.

(Continued)

*Primary Examiner* — Sherief Badawi
*Assistant Examiner* — Jessica N Le
(74) *Attorney, Agent, or Firm* — Polsinelli PC

(57) ABSTRACT

The disclosed technology addresses the need in the art for a content management system that can be highly flexible to the needs of its subjects. The present technology permits any object to be shared by providing a robust and flexible access control list mechanism. The present technology utilizes a data structure that is highly efficient that both minimizes the amount of information that needs to be written into any database, but also allows for fast reads and writes of information from authoritative tables that are a source of truth for the content management system, while allowing for maintenance of indexes containing more refined data that allow for efficient retrieval of certain information that would normally need to be calculated when it is needed.

18 Claims, 20 Drawing Sheets receiving a request to provide data from the aggregates index, wherein the request specifies a search object ID, and a timestamp value or range
550 returning the aggregate value in response to the request
555

(56) References Cited

U.S. PATENT DOCUMENTS

| | | | |
|---|---|---|---|
| 7,945,569 B2* | 5/2011 | Drory | G06F 16/2264 |
| | | | 707/723 |
| 7,979,494 B1 | 7/2011 | Golovin et al. | |
| 8,296,820 B2 | 10/2012 | Kao et al. | |
| 8,601,539 B1 | 12/2013 | Bobel | |
| 10,037,339 B1* | 7/2018 | Kleinpeter | G06F 21/10 |
| 10,282,557 B1 | 5/2019 | Pore et al. | |
| 10,380,369 B1* | 8/2019 | Noe | H04L 63/104 |
| 10,706,166 B1 | 7/2020 | Mandadi et al. | |
| 11,269,872 B1* | 3/2022 | Moo | G06F 16/248 |
| 11,789,976 B2* | 10/2023 | Passey | G06F 16/2282 |
| | | | 707/611 |
| 11,799,958 B2* | 10/2023 | Passey | H04L 67/1097 |
| 11,803,652 B2* | 10/2023 | Passey | G06F 21/6218 |
| 2003/0204513 A1* | 10/2003 | Bumbulis | G06F 16/2246 |
| 2004/0006710 A1 | 1/2004 | Pollutro et al. | |
| 2005/0246762 A1 | 11/2005 | Girouard et al. | |
| 2006/0206940 A1 | 9/2006 | Strauss et al. | |
| 2006/0265377 A1 | 11/2006 | Raman et al. | |
| 2007/0005665 A1 | 1/2007 | Vaitzblit et al. | |
| 2007/0050381 A1* | 3/2007 | Hu | G06F 16/2237 |
| 2007/0233957 A1 | 10/2007 | Lev-Ran et al. | |
| 2007/0244921 A1 | 10/2007 | Blair | |
| 2007/0261102 A1 | 11/2007 | Spataro et al. | |
| 2008/0028033 A1 | 1/2008 | Kendall | |
| 2008/0275891 A1* | 11/2008 | Park | G06F 16/2458 |
| 2010/0057777 A1* | 3/2010 | Williamson | G06F 16/2465 |
| | | | 707/E17.009 |
| 2012/0254842 A1 | 10/2012 | Henderson | |
| 2013/0080393 A1 | 3/2013 | Bird et al. | |
| 2013/0325902 A1 | 12/2013 | Bachar et al. | |
| 2014/0059067 A1 | 2/2014 | Ollikainen et al. | |
| 2015/0081717 A1* | 3/2015 | Pidduck | G06F 16/316 |
| | | | 707/741 |
| 2015/0193489 A1* | 7/2015 | Bachar | G06F 16/2282 |
| | | | 707/756 |
| 2015/0199367 A1* | 7/2015 | Hammer | G06F 16/1748 |
| | | | 707/654 |
| 2015/0254272 A1* | 9/2015 | Regni | G06F 16/2379 |
| | | | 707/694 |
| 2016/0259783 A1 | 9/2016 | Takata et al. | |
| 2017/0199989 A1 | 7/2017 | Lilko et al. | |
| 2018/0012035 A1 | 1/2018 | Rozenberg et al. | |
| 2018/0062852 A1 | 3/2018 | Schmahmann | |
| 2018/0074903 A1* | 3/2018 | Leggette | G06F 3/0659 |
| 2018/0157860 A1 | 6/2018 | Nair et al. | |
| 2018/0189369 A1 | 7/2018 | Baek et al. | |
| 2018/0260467 A1* | 9/2018 | Stewart | G06F 16/27 |
| 2018/0295203 A1 | 10/2018 | Wilde | |
| 2018/0300350 A1* | 10/2018 | Mainali | G06F 16/9027 |
| 2019/0065545 A1* | 2/2019 | Hazel | G06F 16/2282 |
| 2019/0095478 A1* | 3/2019 | Tankersley | G06F 11/3476 |
| 2019/0129972 A1* | 5/2019 | Borate | G06F 16/27 |
| 2019/0129982 A1* | 5/2019 | Wei | G06F 16/2228 |
| 2019/0205418 A1* | 7/2019 | Jayakar | G06F 16/172 |
| 2019/0207929 A1* | 7/2019 | Koorapati | G06F 16/2255 |
| 2019/0213344 A1 | 7/2019 | Hesketh et al. | |
| 2019/0272337 A1* | 9/2019 | Stewart | G06F 16/2282 |
| 2019/0361792 A1* | 11/2019 | Goldberg | G06F 16/178 |
| 2019/0362000 A1* | 11/2019 | Lee | G06F 16/2237 |
| 2020/0125543 A1 | 4/2020 | Zhang et al. | |
| 2021/0303537 A1* | 9/2021 | Liang | G06F 16/2358 |
| 2022/0027334 A1* | 1/2022 | Watkins | G06F 16/13 |
| 2022/0197926 A1* | 6/2022 | Passey | H04L 63/101 |

FOREIGN PATENT DOCUMENTS

| | | | |
|---|---|---|---|
| JP | 2002189746 A | 7/2002 | |
| JP | 2007172021 A | 7/2007 | |
| JP | 2007328400 A | 12/2007 | |
| JP | 2008097301 A | 4/2008 | |
| JP | 2015197810 A | 11/2015 | |
| JP | 2020524321 A | 8/2020 | |
| WO | 2018176139 A1 | 10/2018 | |
| WO | 2019000978 A1 | 1/2019 | |

OTHER PUBLICATIONS

Non-Final Office Action from U.S. Appl. No. 17/129,233, mailed Mar. 17, 2022, 14 pages.

Notice of Allowance from U.S. Appl. No. 17/129,120, mailed Mar. 16, 2022, 13 pages.

Non-Final Office Action from U.S. Appl. No. 17/129,120, mailed Oct. 15, 2021, 13 pages.

Invitation to Pay Additional Fees for PCT Application No. PCT/US2021/040914, dated Jan. 3, 2022, 9 pages.

Kvet M., et al., "Complex Time Management in Databases," Central European Journal of Computer Science, vol. 4, No. 4, Jul. 2014, pp. 269-284.

Final Office Action from U.S. Appl. No. 17/129,233, mailed Nov. 4, 2022, 16 pages.

Non-Final Office Action from U.S. Appl. No. 17/129,446, mailed Nov. 1, 2022, 14 pages.

Final Office Action from U.S. Appl. No. 17/129,446, mailed Mar. 31, 2023, 15 pages.

Non-Final Office Action from U.S. Appl. No. 17/129,337, mailed Jun. 2, 2023, 11 pages.

Non-Final Office Action from U.S. Appl. No. 17/129,386, mailed Jan. 20, 2023, 13 pages.

Non-Final Office Action from U.S. Appl. No. 17/825,571, mailed May 11, 2023, 16 pages.

Notice of Allowance from U.S. Appl. No. 17/129,233, mailed Apr. 28, 2023, 8 pages.

Notice of Allowance from U.S. Appl. No. 17/129,233, mailed Jun. 28, 2023, 8 pages.

Office Action for European Application No. 21749468.1 mailed on Dec. 18, 2023, 9 pages.

Stringer T., et al., "Index Against a Subset of Rows?," Apr. 8, 2014, pp. 1-2, Retrieved from the Internet: URL: https://dba.stackexchange.com/questions/62772/indexagainst-a-subset-of-rows.

Communication Pursuant to Article 94(3) EPC for European Application No. 21749468.1 mailed on Jul. 10, 2023, 7 pages.

Notice of Allowance from U.S. Appl. No. 17/129,233, mailed Aug. 7, 2023, 9 pages.

Notice of Allowance from U.S. Appl. No. 17/129,337, mailed Sep. 28, 2023, 9 pages.

Notice of Allowance from U.S. Appl. No. 17/129,386, mailed Aug. 15, 2023, 9 pages.

Notice of Allowance from U.S. Appl. No. 17/129,386, mailed Jul. 14, 2023, 9 pages.

Notice of Allowance from U.S. Appl. No. 17/129,386, mailed Jul. 28, 2023, 3 pages.

Notice of Allowance from U.S. Appl. No. 17/129,446, mailed Aug. 9, 2023, 12 pages.

Notice of Allowance from U.S. Appl. No. 17/129,446, mailed Aug. 24, 2023, 10 pages.

Final Office Action from U.S. Appl. No. 17/825,571, mailed Nov. 21, 2023, 18 pages.

Notice of Reasons for Refusal for Japanese Application No. 2023-515201 mailed on Jul. 8, 2024, 10 pages.

Notice of Reasons for Refusal for Japanese Application No. 2023-515201 mailed on Jan. 19, 2024, 11 pages.

Notice of Allowance from U.S. Appl. No. 17/129,337, mailed Apr. 24, 2024, 9 pages.

Notice of Allowance from U.S. Appl. No. 17/825,571, mailed Mar. 20, 2024, 9 pages.

Result of Consultation for European Application No. 21749468.1 mailed on Sep. 5, 2024, 4 pages.

Office Action for European Application No. 21749468.1 mailed on Sep. 17, 2024, 89 pages.

* cited by examiner

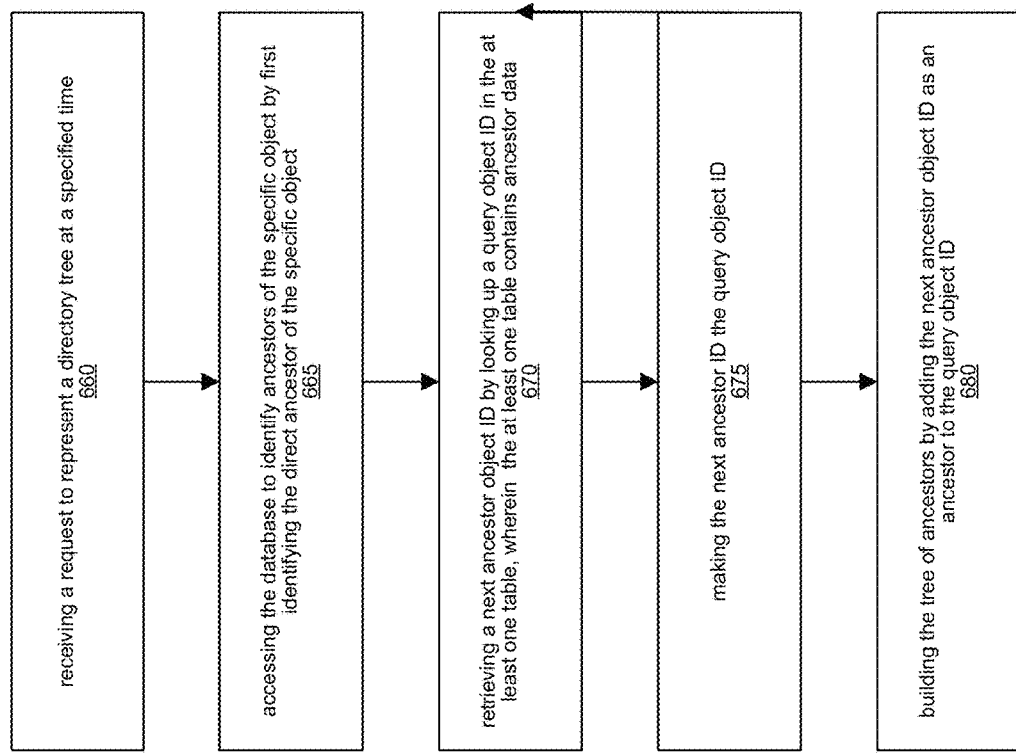
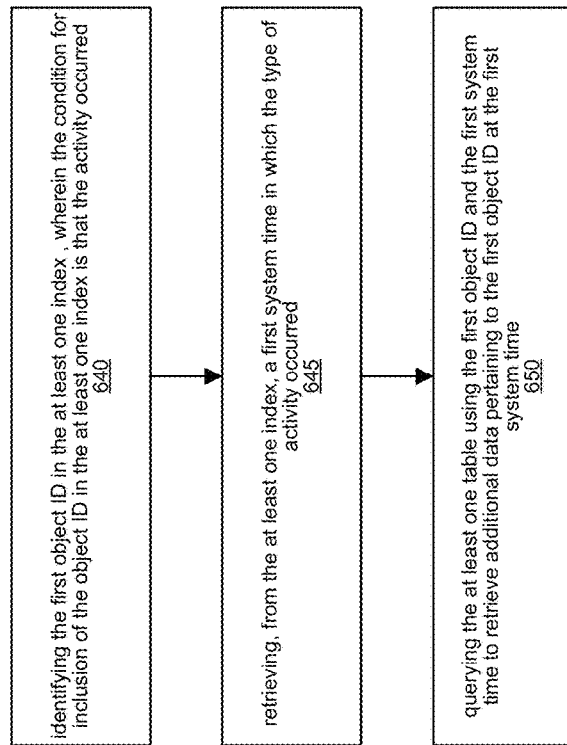
FIG. 10B
FIG. 10A

AGGREGATES INDEX

TECHNICAL FIELD

The present technology pertains to a data service integrated with an efficient, flexible, and robust data model for recording information about changes to objects and subjects in the content management system and more particularly pertains to an aggregates table employed in the context of the content management system.

BACKGROUND

Most content management systems are optimized for a particular usage model and are poorly suited to any other mechanism of usage. This worked fine for content management systems that were deployed in a specific instance on an enterprise level but is not suitable for modern cloud based content management systems.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 10A illustrates an example method determining that an activity occurred that is associated with a first object ID in accordance with some aspects of the present technology;

FIG. 10B illustrates an example method for constructing a representation of a directory tree for a subject account at a specified time in accordance with some aspects of the present technology;

DETAILED DESCRIPTION

Figure 1:
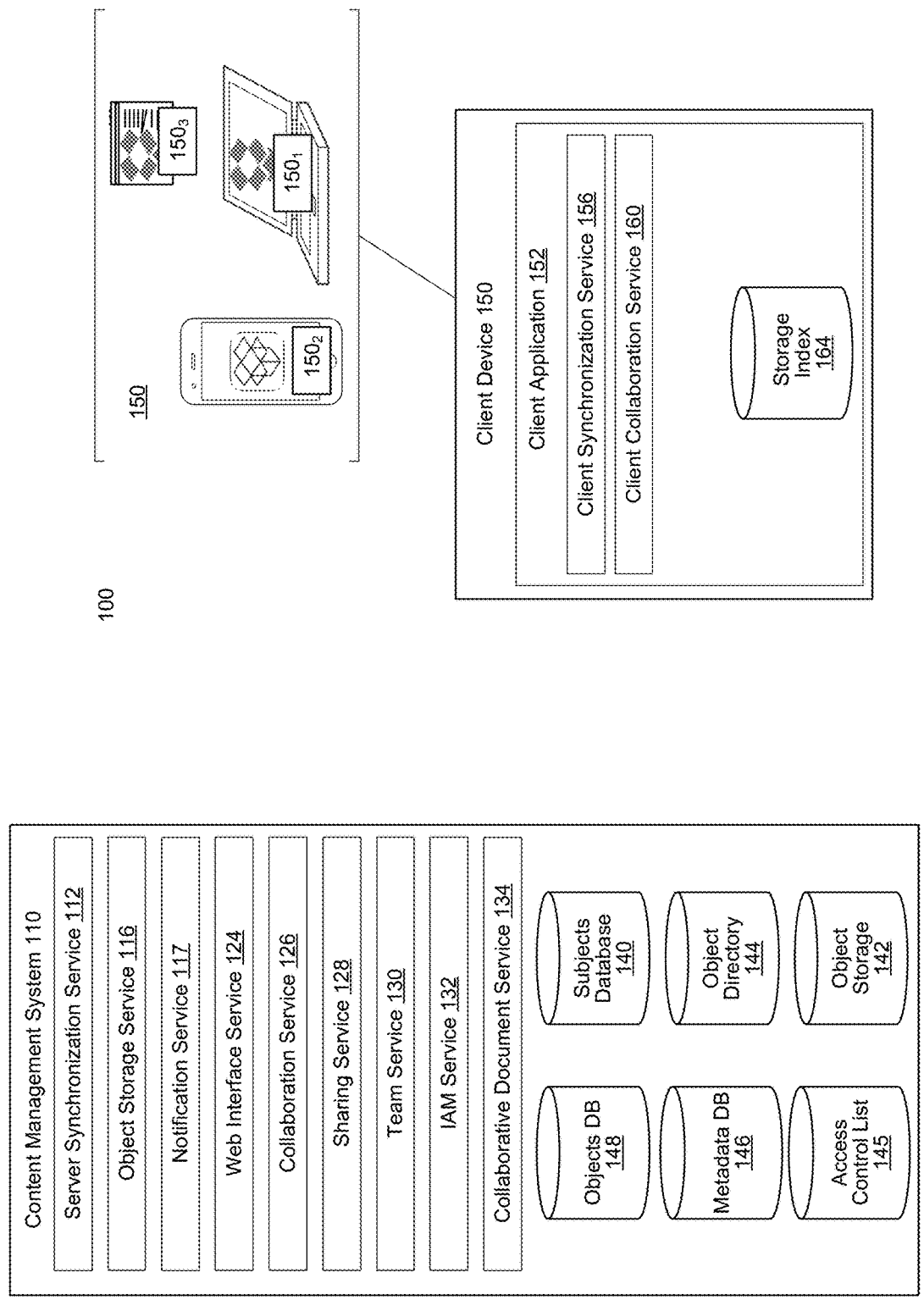
FIG. 1 illustrates an example of a content management system and client devices in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Most content management systems are optimized for a particular usage model and are poorly suited to any other mechanism of usage. This worked fine for content management systems that were deployed in a specific instance on an enterprise level, but is not suitable for modern cloud-based content management systems.

The disclosed technology addresses the need in the art for a content management system that can be highly flexible to the needs of its subjects. For example, there is a need in the art to provide a content management system that can permit any object to be shared. To enable such functionality, a robust and flexible access control list mechanism is needed, as will be described herein. However, such a robust and flexible access control mechanism brings complexity that creates concerns about how quickly access changes, especially those removing access from a subject account, can be manifested. This is further amplified by a content management system that provides a synchronization service, as does the present technology.

The present technology provides solutions to such problems by efficiently checking access at read time. When an object is requested by any client of the content management system, the content management system can efficiently determine if there have been any changes in access. And when it is determined that a change in access had occurred, the content management system can determine new access privileges (or loss thereof).

The present technology also provides for a more flexible access permission model. Access permissions for an object can apply to a whole directory, can apply only to a particular object, can be inherited from a global policy, can be inherited from a direct ancestor, can suppress permissions that would otherwise be inherited, can provide policies that are not able to be suppressed, etc. Any combination of the above policies can be aggregated to make up an access control list for a particular object in a given directory tree. Accordingly, the present technology can accommodate just about any customized collection of access policies.

The present technology provides other benefits such as ensuring that all events that occur on the system are correctly ordered relative to other events happening on the system. This system-wide ordering makes possible to determine historical states of data in the content management system at any time, whereas other systems are limited to discrete time intervals.

The present technology is also highly scalable and efficient. In a widely used content management system millions of actions on objects in the content management system can be occurring in a short period of time. As such the present technology utilizes a data structure that is highly efficient that both minimizes the amount of information that needs to be written into any database, but also allows for very fast reads and writes of information from authoritative tables that are the source of truth for the content management system, while allowing for updating of indexes containing more refined data.

The present technology includes several unique indexes that allow certain data to be quickly read from an index rather than calculated on demand. These indexes also provide for unique and highly efficient look up operations. For example, the present technology includes an aggregates index which updates aggregated values for every object above an object that is the subject of a change. This index not only provides quick access to an aggregated value (number of bytes, number of objects, etc.) under any directory object at any time, but also can be used to determine whether any object had changed under any directory object at any time. Another unique index includes a simple object index, wherein data is written into the index whenever a qualifying event happened. The index reports that the event occurred, but not additional details regarding the event. A similar index is a credential index which includes any subject that is effected by an access permission change (e.g., when an access permission changes for a group, all members of the group are effected). The indexes specifically mentioned above are examples, and other unique indexes and look ups are more fully disclosed herein.

Further the present technology also includes certain data structures that allow for efficient retrieval of certain information that would normally need to be calculated when it is needed.

These and other benefits over the prior art are described herein.

In some embodiments the disclosed technology is deployed in the context of a content management system having object synchronization capabilities and collaboration features, among others. An example system configuration 100 is shown in FIG. 1, which depicts content management system 110 interacting with client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system, and account details can be stored in subjects database 140. Subjects database 140 can identify a registered subject by a subject ID, and store profile information for registered subjects in association with the subject ID. In some cases, profile information for registered subjects includes a subject name and/or email address. Subjects database 140 can include account management information, such as account type (e.g. various tiers of free or paid accounts), storage space allocated, storage space used, client devices 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subjects database 140 need not store complete information associated with an account for a subject. Some portion of information associated with an account for a subject can also be stored in another database of content management system 110 such as metadata database 146, or in a database external to content management system 110.

Subjects database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subjects database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 110 or in other content management systems, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in .object directory 144. Additionally, data regarding changes, access, etc. can be stored in objects database 148. Objects database 148 can also include a subject account identifier that identifies the subject IDs that have access to the object.

In some embodiments, objects database 148 can be broken into a plurality of tables, indexes and other data structures.

Each of the various storages/databases such as object storage 142, object directory 144, objects database 148, and metadata database 146 can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a parent of an object or a content path for an object in objects database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 142 in blocks and may not be stored under a tree like directory structure, such directory structure is a comfortable navigation structure for subjects viewing objects. Object storage service 116 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 142.

While the directory structure in which an account views objects does not correlate to storage locations of the objects at content management system 110, the directory structure can correlate to storage locations of the objects on client device 150 depending on the file system used by client device 150.

As addressed above, a content entry in object directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

Object storage service 116 can also store metadata describing objects, object types, folders, file path, and/or the relationship of objects to various accounts, collections, or groups in metadata database 146, in association with the object ID of the object.

Object storage service 116 can also store a log of data regarding changes, access, etc. in objects database 148. Objects database 148 can include the object ID of the object and can optionally include a description of the change or access action along with a time stamp or version number and any other relevant data. Objects database 148 can also include pointers to blocks affected by the change or object access. Object storage service 116 can also provide the ability to undo operations, by using an object version control mechanism that tracks changes to objects, different versions of objects (including diverging version trees), and a change history that can be acquired from objects database 148.

Object Synchronization

Another feature of content management system 110 is synchronization of objects with at least one client device 150. Client device(s) 150 can take different forms and have different capabilities. For example, client device $150_1$ is a computing device having a local file system accessible by multiple applications resident thereon. Client device $150_2$ is a computing device wherein objects are only accessible to a specific application or by permission given by the specific application, and the objects are typically stored either in an application specific space or in the cloud. Client device $150_3$ is any client device accessing content management system 110 via a web browser and accessing objects via a web interface. While example client devices $150_1$, $150_2$, and $150_3$ are depicted in form factors such as a laptop, mobile device, or web browser, it should be understood that the descriptions thereof are not limited to devices of these example form factors. For example, a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices 150 are associated with an account of content management system 110, but in some embodiments client devices 150 can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the object into blocks, hashing the object to generate a unique identifier, etc. Client synchronization service 156 can index content within client storage index 164 and save the result in client storage index 164. Indexing can include storing paths plus the object identifier, and a unique identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update objects database 148, metadata database 146, object directory 144, object storage 142, subjects database 140, etc. as appropriate.

When synchronizing from content management system 110 to client device 150, data regarding a mount, modification, addition, deletion, move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150 all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real time, instant messaging, providing presence and "seen" state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of subject accounts.

To share an object within content management system 110 sharing service 128 can associate a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed. In some embodiments, objects can inherit access rights from another object such as ancestor objects.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include a token identifying an object ID and optionally a subject ID in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service 130 can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g. a subject account with subject rights and administrator rights) IAM service 132 can also facilitate explicit privilege escalation to avoid unintentional actions by administrators.

Object Access

Object storage service 116 can receive a token from client application 152 that follows a request to access an object and can return the capabilities permitted to the subject account.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notifications service 117 when client device 150 is accessing the object. Notifications service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments content management service can also include collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third Party Services

In some embodiments content management system 110 can include functionality to interface with one or more third party services such as workspace services, email services, task services, etc. In such embodiments, content management system 110 can be provided with login credentials for a subject account at the third party service to interact with the third party service to bring functionality or data from those third party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
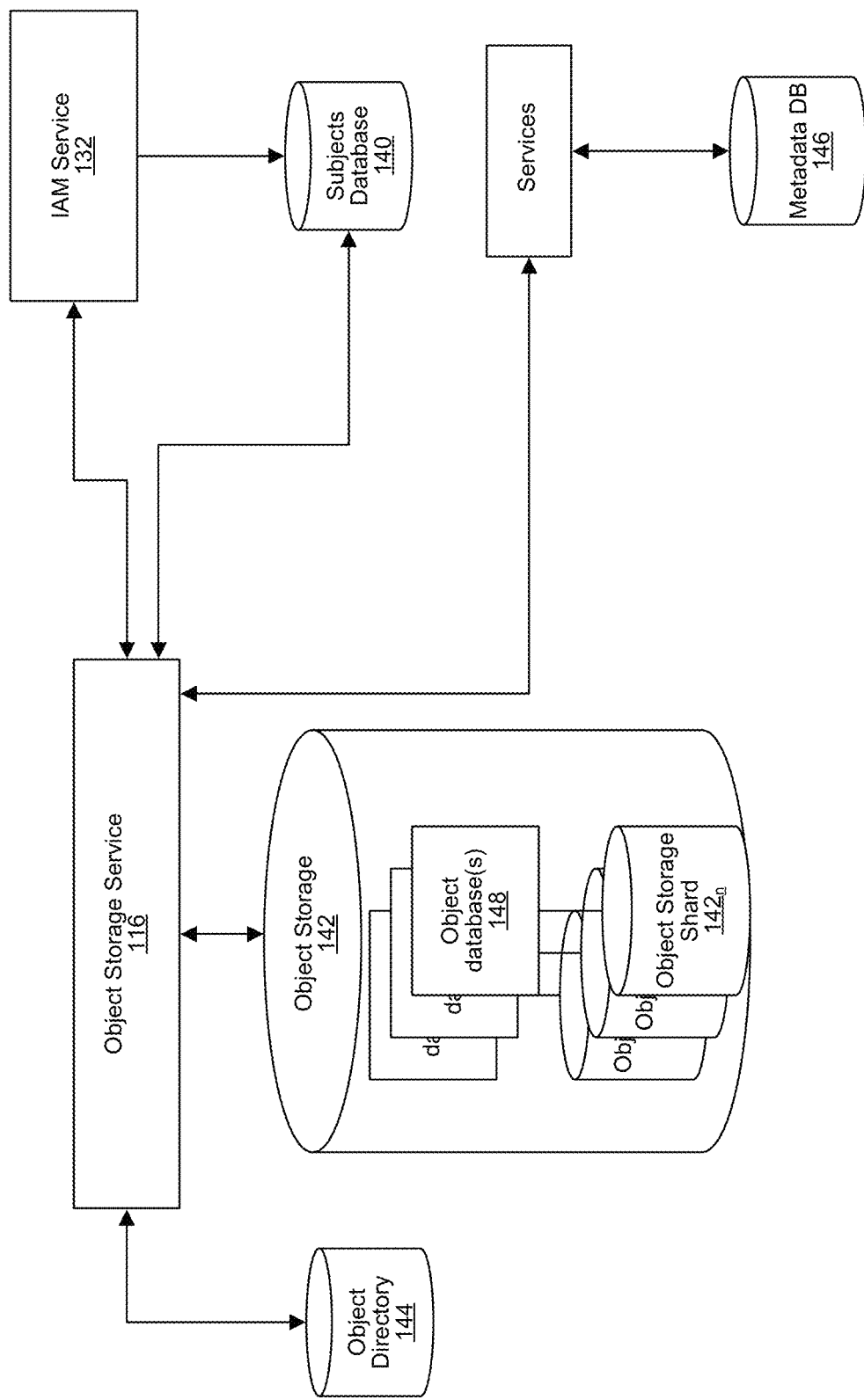
FIG. 2 illustrates additional details of the content management system including an object storage service in accordance with some aspects of the present technology.

FIG. 2 illustrates additional details of content management system 110, in accordance with some embodiments. For example, FIG. 2 illustrates object storage service 116 which, as described above, is configured to determine where objects are stored in object storage 142, among other functions.

Object storage 142 is illustrated as being divided amongst a plurality of object storage shards 142*n* and associated with each shard is a portion of objects database 148. Objects are distributed across various of the object storage shards 142*n*, and data associated with the object on a particular object storage shard 142*n* is stored in the portion of objects database 148 that is also stored on the same shard. To facilitate this distribution of object storage database 142 across a plurality of shards, object storage service 116 can direct data to be written into objects database 148 to the appropriate portion of the object database on the appropriate shard. Furthermore, when an object is moved from one object storage shard 142*n* to another object storage shard 142*n*, object storage service 116 is responsible for both migrating the object across shards and for migrating data in objects database 148 pertaining to that object to the new object storage shard 142*n*.

FIG. 2 also illustrates IAM service 132 in communication with object storage service 116 and subjects database 140. As will be addressed further herein, IAM service 132 can interact with object storage service 116 and objects database 148 to determine access information pertaining to objects. IAM service 132 can also interact with subjects database 140 to perform identity and access services.

FIG. 2 also illustrates, generically, services which represent any one of services discussed with respect to FIG. 1 or other services that may need to interact with or otherwise be a client of object storage service 116, objects database 148, or metadata database 146 to perform one or more functions described further herein.

Figure 3:
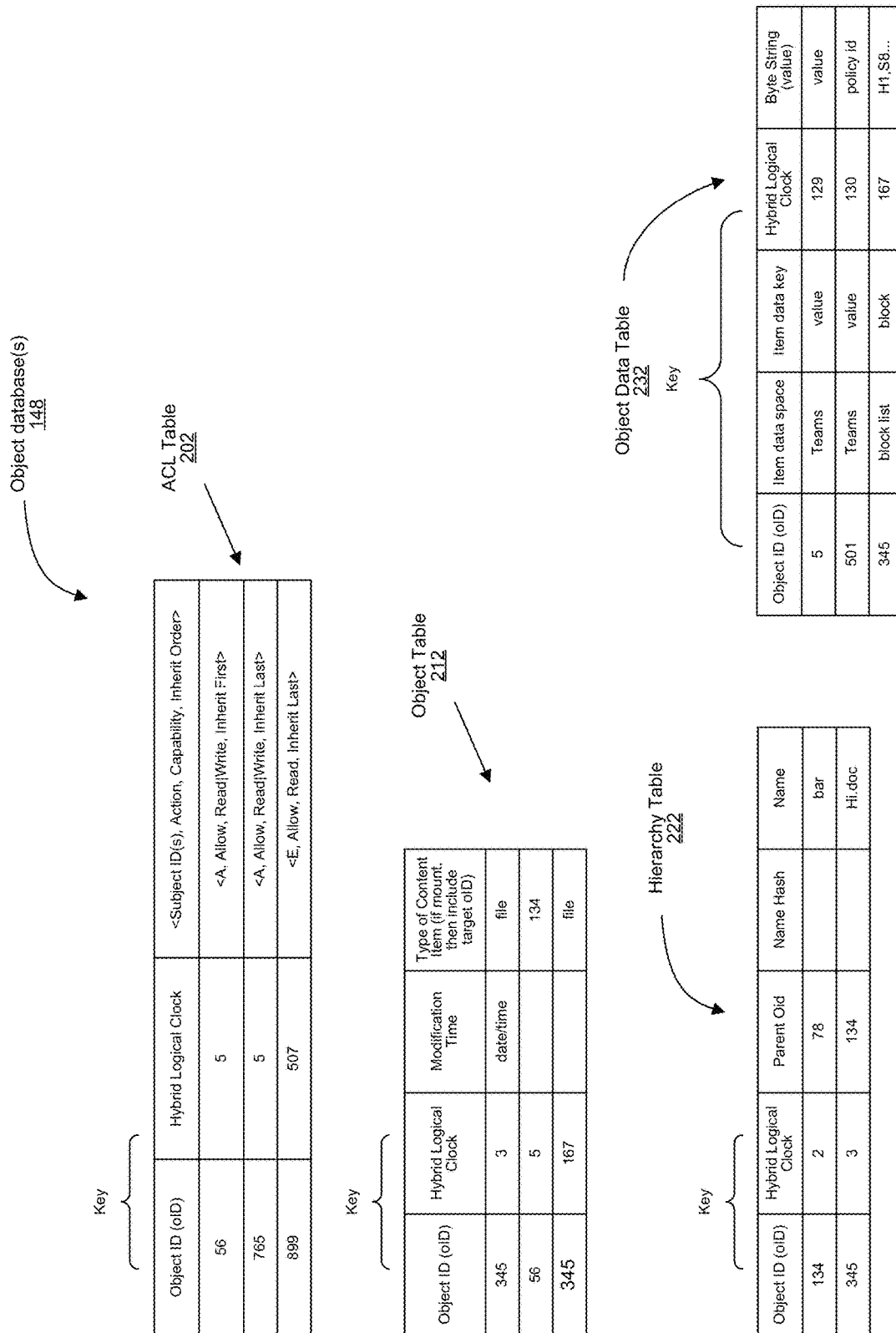
FIG. 3 illustrates an example of an object database in accordance with some aspects of the present technology.

FIG. 3 illustrates an example of objects database 148, in accordance with some embodiments. Objects database 148 can be made up of a collection of tables and indexes. For example, FIG. 3 illustrates several tables including access control list (ACL) table 202, object table 212, hierarchy table 222, and object data table 232. As used herein, "tables" are distinguished from "indexes" wherein tables refer to a source of truth for data, whereas an index can include processed and (re)organized data that represents and is derived from the source-of-truth data stored in one or more tables. In some embodiments, the tables are configured to maximize efficiency and store only minimally descriptive data effective to perform its intended function. The minimally descriptive data may not include data that can otherwise be derived from other data in a table.

While the present disclosure will describe the particular organization of tables and indexes, the present technology should not be limited by such organization. The present technology utilizes tables for specific functions to make writing to the various tables more efficient. The specific functions supported by the tables in FIG. 3 can be to perform access, synchronization, and versioning tasks, but they can be used to support other tasks as well.

All of the data shown in individual tables in FIG. 3 could be combined into one bigger table. However, if all of the data were in just one table, due to the increase in the number of write operations to the table, it would become more likely that some write operations to the table would have to be delayed in order to process all the write operations occurring the table. However, by dividing the data into several different tables the number of write operations needed into any table is reduced, and space can be saved. For example, when a change in access occurs, it is only needed to write data into ACL table 202, and when a change to an object occurs is only needed to write data into object table 212.

Likewise, while the present disclosure will address various indexes that include additional data beyond the data that is presented in a table, a person of ordinary skill in the art will appreciate that such additional data could also be included in a table. Furthermore, in some embodiments, the present technology is configured to calculate certain data on the fly when needed, as opposed to tracking this data in a table or an index. Persons of ordinary skill in the art will appreciate that such data that is calculated could also be stored in a table or index.

The tables and indexes in objects database 148 are all key-value stores, however, the present technology should not be limited to such data structures. All the tables in objects database 148 refer to an object ID (oID) and a hybrid logical clock (HLC). In many of the tables and indexes in objects database 148 oID and HLC make up the key for performing lookups in the various tables and indexes in objects database 148. However, some tables and indexes may include additional or different data as their keys.

The oID is an ID for an object. An object generally is any entity that can be recorded in the file system. The hybrid logical clock (HLC) is a clock value that combines aspects of a time clock and a logical clock. HLC guarantees that all events on a particular machine will be recorded in the order that they happen and also that all events after a transmission on a receiving machine will be ordered after the events before the transmission on the sending machine. In this way many different devices whose clocks might be very well synchronized, but will still have small but potentially significant deltas between their respective clocks, can ensure that events taking place across the many devices of the system can all have an absolute relative ordering. In other words, a hybrid logical clock provides a system-wide mechanism for the relative ordering of events taking place across the many devices of the system. For example, a machine can use a timestamp for all actions that occur on it, but when it sends a communication to another machine, it will increment a system wide logical counter, and every new action occurring on a receiving machine will be ordered after the time of the logical counter regardless of what its clock is or what the clock value of a received transmission is.

All rows in all of the tables and indexes of objects database 148 are immutable. The tables and indexes can add new rows, but data is never deleted or overwritten, except for cleaning up unneeded rows (rows outside of a retention window or for subjects that no longer have an account). This property, plus the inclusion of the hybrid logical clock in each row, provides a capability to the system to be able to provide a snapshot of the state of any object, or collection of objects, in the system at a current time as well as at any historical point in time. This will be addressed in greater detail below with respect to FIG. 17 and FIG. 18.

As introduced, objects database 148 can be made up of several tables and indexes. ACL table 202 is optimized to record all changes in permissions (including access) pertaining to an object. In some embodiments, permissions are expressed in terms of a tuple of subject, action, capability, and inheritance, and these are all recorded in ACL table 202. While reference to a tuple is used throughout this description, persons of ordinary skill in the art will appreciate that any mechanism to represent a collection of values can be used.

A subject (identified by a subject ID (sID)) pertains to any actor in the content management system. An actor can be a subject account for an individual, a team or group that maps to accounts of individuals, an organization that maps to teams, a group of groups, etc. In some embodiments, more than one subject ID can be listed in a permissions statement.

An action defines whether a subject is allowed or not allowed to perform a capability and can be conditional on other factors. The table below describes some example actions.

| Action | Description |
| --- | --- |
| Allow | Allow the capability if the subject is in sID |
| Deny | Deny the capability if the subject is in sID |
| Allow_If_Not | Allow the capability if the subject is NOT in sID |
| Deny_If_Not | Deny the capability if the subject is NOT in sID |
| Allow_Inherit | Allow inheritance of the capability if the subject is in sID |
| Deny_Inherit | Deny inheritance of the capability if the subject is in sID |
| Allow_Inherit_If_Not | Allow inheritance of the capability if the subject is NOT in sID |
| Deny_Inherit_If_Not | Deny inheritance of the capability if the subject is NOT in sID |

Collectively these actions provide for the ability to create highly customized permission statements. As noted above, the present technology provides an improvement over the state of the art by supporting a wide array of potential permissions, and by accounting for a wide variety of permission organization schemes in a highly efficient system. Some entity accounts might be governed by general-purpose top-level rules, but for which exceptions might sometimes be necessary. For example, an organization account might allow the sharing of objects by team members as long as the sharing is within the organization. This policy would be a top-level policy that applies to every object in the organization's account. But it might be the case that an exception needs to be made, and the actions above would allow such an exception.

Some actions also refer to an inheritance. ACL table 202 also includes a column regarding inheritance order, which refers to whether the object should inherit permissions from another object. Most content management systems follow an inherit last scheme where, in a tree directory structure, every node inherits permissions from its immediate ancestor. However, the present technology can support inheritance from either the top of a directory structure, or from the direct ancestor (inherit last), or to not inherit permissions at all. The combination of these inheritance schemes also contributes to the highly customized permissions possible for any object. It is possible to have all objects comply with an inherit-first permissions statement, which can be thought of as a top-level policy that applies to all objects below it in a directory tree, while also having inheritance for some properties coming from its immediate ancestor. It is also possible, that a specific object could inherit none of the inherit-first or inherit-last permissions statements. In some instances, it is possible that a subject could have access to an object without having access to any ancestor or child objects in a directory structure.

The capability value of the ACL table 202 defines what privileges are being impacted. The privileges in the capability column are defined in combination with the action and inheritance columns. The table below identifies and describes some example capabilities (when coupled with an "Allow" action).

| Capabilities | Description |
| --- | --- |
| None | The subject has no privileges to the object. This can also be used to remove privileges from a subject. |
| Read | The subject can read the object. |
| Write | The subject can edit the object or add objects to a directory. |
| Comment | The subject can comment on an object. |
| Set ACL | The subject can define privileges for the object (editing of action, capability, or inheritance) for the object. |
| Delete | The subject can delete the object. |
| All | The subject has all privileges on an object. |

Collectively the sID, Action, Capability, and Inheritance columns represent a tuple that makes up specific permissions statements pertaining to an object. Each row can include multiple of these tuples pertaining to an object ID that were affected at the stated hybrid logical clock value.

Permissions can be added or changed for the object ID at a later time (later hybrid logical clock value), and those permission statements can be listed in a new row pertaining the object ID and the later hybrid logical clock value.

When referring to capabilities for a given object in the context of a content management system, it is common to refer to an Access Control List (ACL), which is a definition of all of the permissions provided to an object. In some embodiments of the present technology, no ACL is stored, but it can be derived as will be addressed with respect to FIG. 13, below.

FIG. 3 also illustrates object table 212, which records information regarding changes made to an object. Object table 212 also includes columns for object ID and hybrid logical clock to identify the object and the system time that the modification occurred. In addition to recording changes made to objects, object table 212 can be used to identify versions of an object at particular times.

Object table 212 can also be used to identify an approximate date and time to which a hybrid logical clock value can correspond, called Modification Time. Modification Time is a representation of clock time (date and time of day) that a change was made.

Object table 212 also includes a column that identifies the type of object. For example, a column can indicate whether an object is a file or directory. In some embodiments, the modification to the object might not be to change the object itself, but could be to mount a directory under another directory. In the example of a mount, the type of object can list a target object ID for the directory in which the object is mounted.

FIG. 3 also illustrates hierarchy table 222. Hierarchy table 222 records each object's direct parent (i.e., direct ancestor) in the column for ancestor oID. Hierarchy table 222 also records the name of an object and a hash of the object's name. In addition to recording an object's direct parent, hierarchy table 222 can be used to determine a directory tree above an object all the way to its root, as illustrated in more detail below.

FIG. 3 also includes object data table 232. Object data table 232 records data associated with objects. Object data table 232 is configured to account for and identify a wide array of different possible data. The item data space and item data key identifies objects that are relevant to a specific category and value, while the byte string can be any value to be stored in association with the object.

For example, the item data space could identify a product feature or an engineering team that is responsible for providing certain features to content management system 110, and the item data key is a value associated with or assigned by the team. In other words, the combination of the item data space and item data key can serve as a free format where an engineering team could encode any type of information they need by using some format determined by the engineering team. For example, a byte string can represent the following information: Policy ID=123; Object Type=7. This allows any engineering team using the system to easily add any number and any type of data fields to any object. Thereby the item data space plus the item data key columns can be used to identify all objects that have data pertaining to that engineering team or the product feature. The byte string can include specific data that product feature or engineering team might wish to store and retrieve. In this way, object data table 232 can be extensible to be able to store any new data pertaining to an object by defining a new item data space and/item data key.

In another example, object data table 232 also includes a block list. As addressed above, objects can be broken into blocks, and the data in the column for the block list identifies the blocks that make up the object at that time (after the modification is recorded in object table 212). Entries into the table pertaining to blocks associated with a content item can be identified by the item data space column so the table can be searched for entries for an object ID that include block list information in a particular HLC range. The value can include the complete string of blocks that make up the object, or it can include only the block or block(s) that have been modified.

As addressed above, the tables in FIG. 3 collectively record essential information to perform access, synchronization, and versioning tasks. The tables in FIG. 3 are configured to be highly efficient, wherein data that is not necessary for the efficient performance of the essential tasks of the content management system are excluded from these tables. Further, these tables are maintained individually to optimize how often, and the situations in which, it is necessary to write to these tables.

Figure 4:
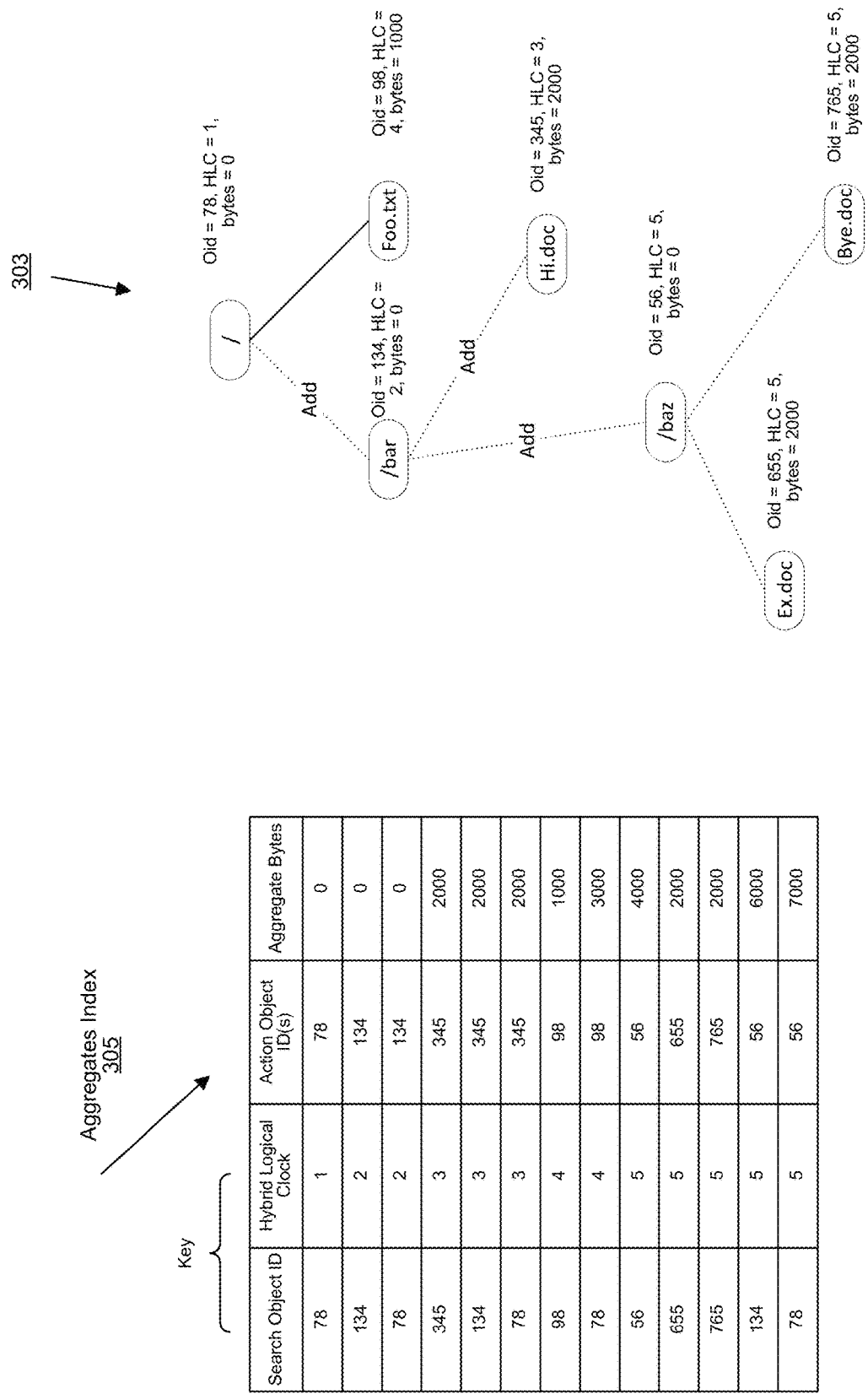
FIG. 4 illustrates an example aggregates index in accordance with some aspects of the present technology.

FIG. 4 illustrates an example aggregates index 305. Aggregates index 305 is a part of objects database 148, and like the tables illustrated in FIG. 3 aggregates index 305 can be stored on shards in object storage 142. As addressed above the data in aggregates index 305 can be derived from the tables illustrated in FIG. 3.

In some embodiments, content management system 110 may need to provide aggregated data. For example, content management system 110 may need to be able to provide an aggregate value for an object in a directory tree. For example, aggregates index 305 in FIG. 3 records an aggregate number of bytes under a particular directory. However, it will be appreciated that other types of aggregation data may be of interest and such data can be recorded in additional columns of aggregates index 305, or other aggregates indexes can exist to aggregate other types of aggregation data.

Since aggregates index 305 includes immutable rows like all of the other tables and indexes in objects database 148, whenever a change is made at the bottom of a directory tree new rows need to be written into aggregates index 305 for every object on the way up the tree that is impacted by the change made at the bottom of the directory tree. FIG. 4 illustrates a simple example of how the aggregates index 305 can be populated as new objects are added to directory tree 303.

For example FIG. 4 illustrates that a new directory "/bar" having in oID=134 and occurring at HLC=2 has been added under the root. Multiple rows 306 need to be written into aggregates index 305 to account for the addition of oID=134 to directory tree 303. The top of rows 306 represents the addition of oID=134 to directory tree 303, while the following row represents any changes that happen to the root of the directory oID=78.

At a later time occurring at HLC=3 an object "hi.DOC" having oID=345 is added to directory tree 303. OID=309 is a file object having a size of 2000 bytes. Rows 308 in aggregates index 305 illustrate the changes to aggregates index 305 to account for the addition of oID=345. As illustrated, first a row is included in aggregates index 305 for oID=345 showing that it has size of 2000 bytes. Then a row is written for its most direct ancestor oID=134 showing that below that directory there is an aggregate of 2000 bytes. And finally, a row is written for route oID=78 showing that below the root there is an aggregate number of 2000 bytes in directory tree 303.

At a later time occurring at HLC=4 object "Foo.txt" having oID=98 is 1000 bytes is added to directory tree 303. Rows 310 in aggregates index 305 illustrate the changes to aggregates index 305 to account for the addition of oID=98 to the directory tree. As illustrated a first row is included in aggregates index 305 for oID=98 showing that it has 1000 bytes. Then a row is added for its direct ancestor oID=78 showing that below oID=78 there is now 3000 bytes. The 3000 bytes is the aggregate of the number of bytes for oID=98 and the number of bytes for oID=345.

At a still later time, occurring at HLC=5 a directory "/baz" has been added to directory tree 303 having oID=56. While oID=56 has zero bytes it includes two additional objects beneath it, oID=655 and oID=765, which each have a size of 2000 bytes. Since each of oID=56, 655, and 765 all were added to the directory structure at HLC=5 we know that all three objects were added as part of the same operation (e.g. directory object oID=56 was copied or moved into directory tree 303 illustrated in FIG. 4). Rows 312 in aggregates index 305 illustrates the changes to aggregates index 305 to account for the addition of oIDs=56, 655, and 765. The first three rows in the collection of rows 312 represent the addition of the three new objects to aggregates index 305. The second to last row represents a row for the direct ancestor to oID=56, that is a row for the updated aggregate bytes under oID=134 of which there are now 6000 bytes. The 6000 bytes comes from 2000 bytes from oID=655, 2000 bytes from oID=765, and 2000 bytes from oID=345. The final row is for the next directory up the tree 303, the top of the directory, oID=78 which now has 7000 aggregate bytes under it. The 7000 bytes comes from 2000 bytes from oID=655, 2000 bytes from oID=765, 2000 bytes from oID=345, and 1000 bytes from oID=98.

In some embodiments, the aggregates index need not include any aggregated values to be useful. As the aggregates index receives a new row whenever a change is made to an object below a directory object that is the search object ID for that row, aggregates index can, at a minimum, be an easy source to determine when a change occurred under a directory object listed in the aggregates index.

Figure 5:
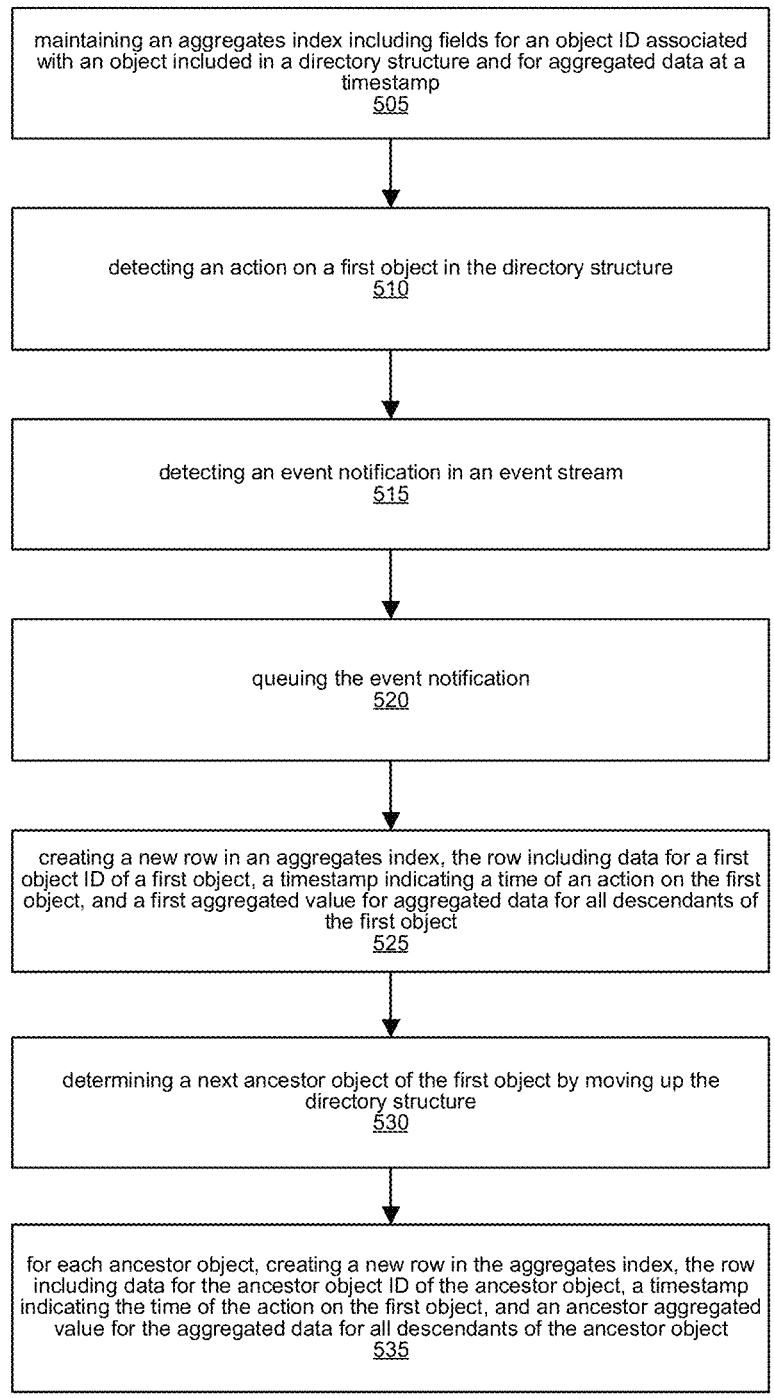
FIG. 5 illustrates an example method of writing to and maintaining an aggregates index in accordance with some aspects of the present technology.

FIG. 5 illustrates an example method of writing to and maintaining (505) an aggregates index such as aggregates index 305. For example, the object storage service 116 may maintain an aggregates index by coordinating writes and reads from the aggregates index. Although the example method illustrated in FIG. 5 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, the aggregates index (e.g., aggregates index 305) includes fields for an object ID (oID) associated with an object included in a directory structure. A directory structure can be a collection of objects arranged into directories and files wherein there is at least one directory located within another directory, and wherein a structure of at least two levels (a first-level root, and a second-level child directory) exists.

As illustrated in FIG. 4, aggregates index 305 can include rows containing a search object ID which is the subject of the row, an action object ID which is the object ID causing the row to be written (a change occurred to the action object ID) and a timestamp (e.g., HLC value). Aggregated data can also be included in aggregates index 305 and is descriptive of an aggregation of data for all descendants of the search object ID (oID) identified in the particular row of the aggregates index.

In some embodiments, the aggregates index includes a plurality of immutable rows, whereby any row in the aggregates index represents the aggregated data for the object ID represented in that row during a time period starting at the timestamp represented in that row and ending at a later timestamp represented in another, later written, row for the object ID. For example, the aggregated bytes value for oID=134 at HLC=3 is valid until oID=134 appears again in aggregates index 305 at HLC=5 and its aggregated bytes value is updated. That is from the period starting at HLC=3 until just before HLC=5, oID=134 has 2000 aggregated bytes beneath it in the directory tree. If aggregates index 305 were queried at HLC=4 for the aggregated bytes for oID=134, it would return a value of 2000 bytes.

While aggregates index 205 includes aggregated data for aggregate bytes, the aggregated data could be any aggregated value for at least one category including a number of bytes under the object, or a number of objects under the object, or a number of objects of a particular type, etc. In some embodiments, the aggregated data can include two or more aggregated values, such as a number of bytes as well as a number of objects under the object.

In some embodiments, the method described in FIG. 5 includes detecting (510) an action on a first object in the directory structure. For example, a server synchronization service 112 or client synchronization service 156 can detect (510) an action on an object and can call object storage service 116 to update objects database 148.

In some embodiments, the method further includes detecting (515) an event notification in an event stream. For example, object storage service can detect (515) the event notification and in response to object storage service 116 receiving the communication indicating a change to an object, it can coordinate making associated changes to objects database 148, which includes updated one or more tables such as object table 212 or hierarchy table 222, and aggregates index 305.

In addition to making the changes to the one or more tables of objects database 148, in some embodiments the method includes queuing (520) the event notification until new rows can be created and added to aggregates index 305. Objects database 148 is configured to facilitate nearly real-time writes to tables, but, in some embodiments, processing for indexes such as aggregates index 305 can be queued (520) by object storage service 116 until the processing of data and writing of new rows in the indexes can be performed. In some embodiments, the creating the new row in the aggregates index 305 can be an asynchronous process compared to a process for tracking the action on the object in at least one authoritative table (e.g., tables of objects database 148 such as ACL table 2020, object table 212, hierarchy table 222, and object data table 232).

In some embodiments, there is no need to perform the queuing (520) of the event notification. In many instances the changes to the aggregates index 305 can be limited enough that these changes can be made in nearly real time, and in coordination with writes to corresponding tables such as object table 212 or hierarchy table 222. When a directory tree under a directory is relatively shallow, such as about 10 levels or less the number of write and processing can be performed quickly enough that the updating of aggregates index 305 can be performed synchronously in coordination with updating the tables and accordingly the queuing (520) may not be needed.

Additionally, in most instances updating data for a collection of directory objects in the aggregates index 305 will not interfere with each other and many operations can be performed on index concurrently.

When the event notification reaches the top of the queue and the aggregates index is ready to receive the updated data, the method includes creating (525) new row(s) in the aggregates index. The new row(s) include data for an object ID (oID) of a first object(s) for which a change occurred, a timestamp indicating a time of an action on the first object(s), and a first aggregated value for aggregated data for all descendants of the first object.

In some embodiments, the update of the aggregates index is not complete when new row(s) is written for the object for which a change occurs. The aggregates index also needs to include new rows for each ancestor of the object(s) for which the change occurred. As such the method includes recursively performing the following steps until a row is written for the top of the directory structure: determining (530) a next ancestor object of the first object for which the change occurred by moving up the directory structure; and for each ancestor object, creating (535) a new row in the aggregates index, the row including data for the ancestor object ID of the ancestor object, a timestamp indicating the time of the action on the first object, and an ancestor aggregated value for the aggregated data for all descendants of the ancestor object.

Aggregates index 305 can be useful for efficiently returning results to several types of queries. In one example a query can be received by object storage service 116 to determine aggregated data below a directory indicated by an object ID during a time range indicated by an HLC value. Object storage service 116 can translate the query into a lookup of aggregates index 305 and can return the requested aggregate value. Since, the search object ID might not exist in aggregates index 305 during the time range indicated in the query, object storage service might need to search for all occurrences of the search object ID prior to the end of the HLC range to identify an occurrence of the search object ID that immediately precede the HLC range. This would result in the value requested by the query at the start of the range since new values are only written when there is a change, an earlier value that has been unchanged remains valid until a new value is recorded.

In another example query, object storage service 116 can receive a query to determine if a directory identified by an object ID has included any change to a content item during a period of time. Since aggregates index 305 will receive an update whenever a change to an object occurs, if an object ID exists in aggregates index 305 during a time range (HLC range), then some change occurred beneath the search object ID. The change will have occurred on the object ID listed in the action object ID field listed in aggregates index 305. Accordingly, object storage service 116 can translate a query to determine if a directory had any changes occurring beneath it into a query to identify the object ID during an HLC range. If the object ID exists during that range, then a change occurred under that object ID. If the object ID is not returned from a look up of aggregates index 305, then no change occurred.

Likewise, in another example, object storage service 116 can receive a query to identify what changed under a directory during an HLC range. If the lookup of aggregates index 305 returns any rows from the index, then the action object ID values in the returned data will indicate the objects that were changed during that period.

Figure 6:
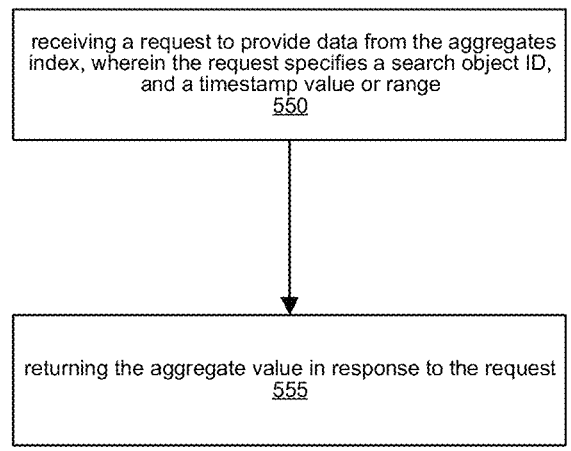
FIG. 6 illustrates an example method for receiving a query of aggregates index and responding to the query in accordance with some aspects of the present technology.

FIG. 6 illustrates an example method for receiving a query of aggregates index and responding to the query. Although the example method illustrated in FIG. 6 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, the method illustrated in FIG. 6 includes receiving (550) a request to provide data from the aggregates index. For example, object storage service 116 may receive a request to provide data from the aggregates index. The request can specify a search object ID, and a timestamp value or range (e.g., an HLC value or range of values).

In some embodiments, the method includes returning the aggregate value in response to the request at step 555. For example, the object storage service 116 may return the aggregate value in response to the request. For example, query can identify a request for the aggregated bytes value for oID=134 at HLC=5, and the aggregates index can return a value of 6000 bytes.

Figure 7:
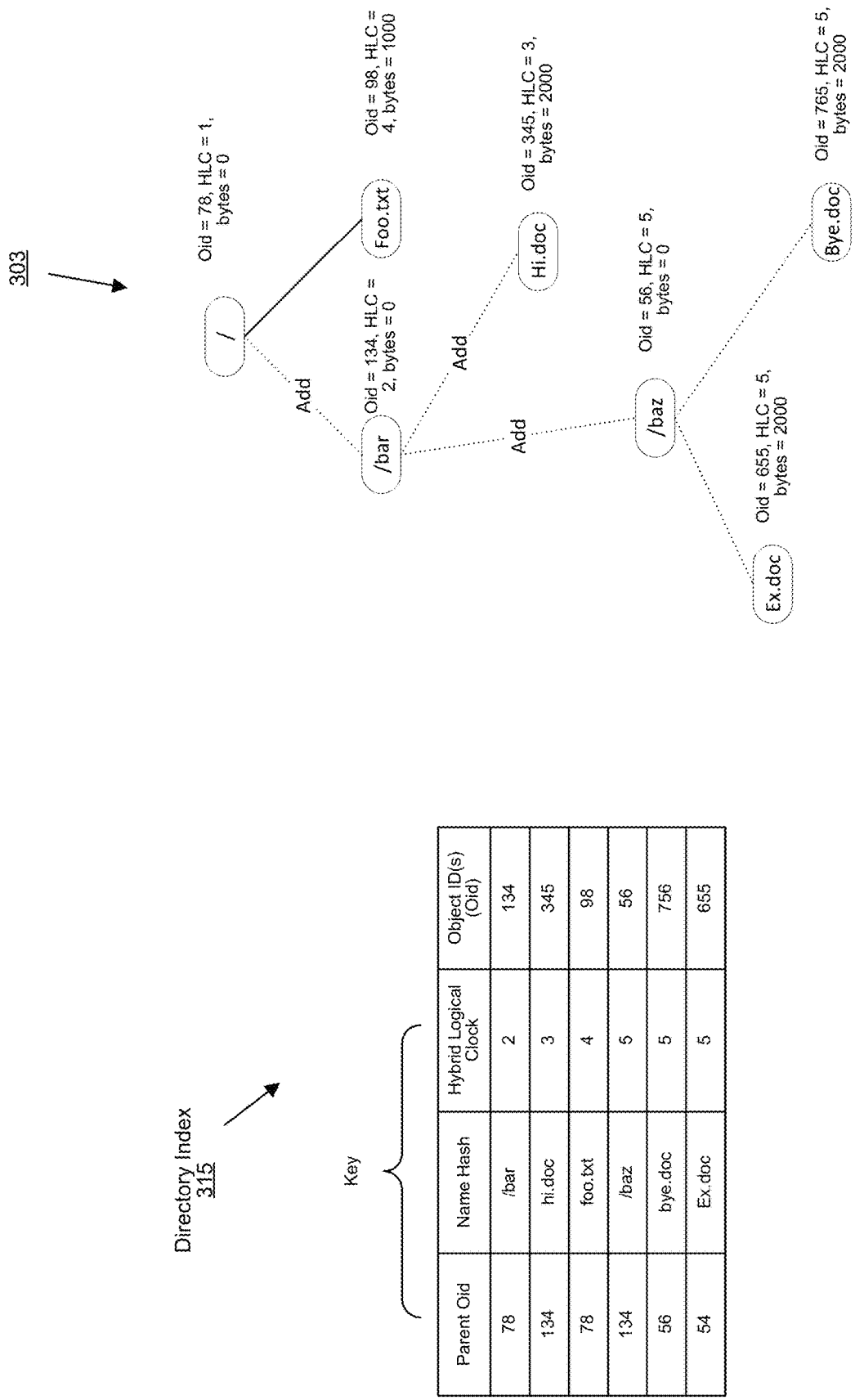
FIG. 7 illustrates a directory index in accordance with some aspects of the present technology.

FIG. 7 illustrates directory index 315, which is a part of objects database 148. In some ways directory index 315 is the opposite of hierarchy table 222. Where hierarchy table 222 recorded a direct ancestor to an object, directory index 315 records a direct child of an object. Directory index 315 allows services within content management system 110 to perform searches by a parent object ID during a time range indicated by hybrid logical clock values to find all direct children of the parent object ID and to perform searches by looking up an object ID for a specific object by looking up the parent object ID and the name hash of specific objects during a time range indicated by hybrid logical clock values.

Just as with aggregates index 305, all rows in directory index 315 are immutable. Thus, whenever an object is added to or removed from a directory, at least one new row can be written to directory index 315. FIG. 6 illustrates a simplified example where objects are only added. As such there is a new row in directory index 315 every time an object is added as can be seen in the far right column where an object ID for every object below the root is added to directory index 315.

Figure 8:
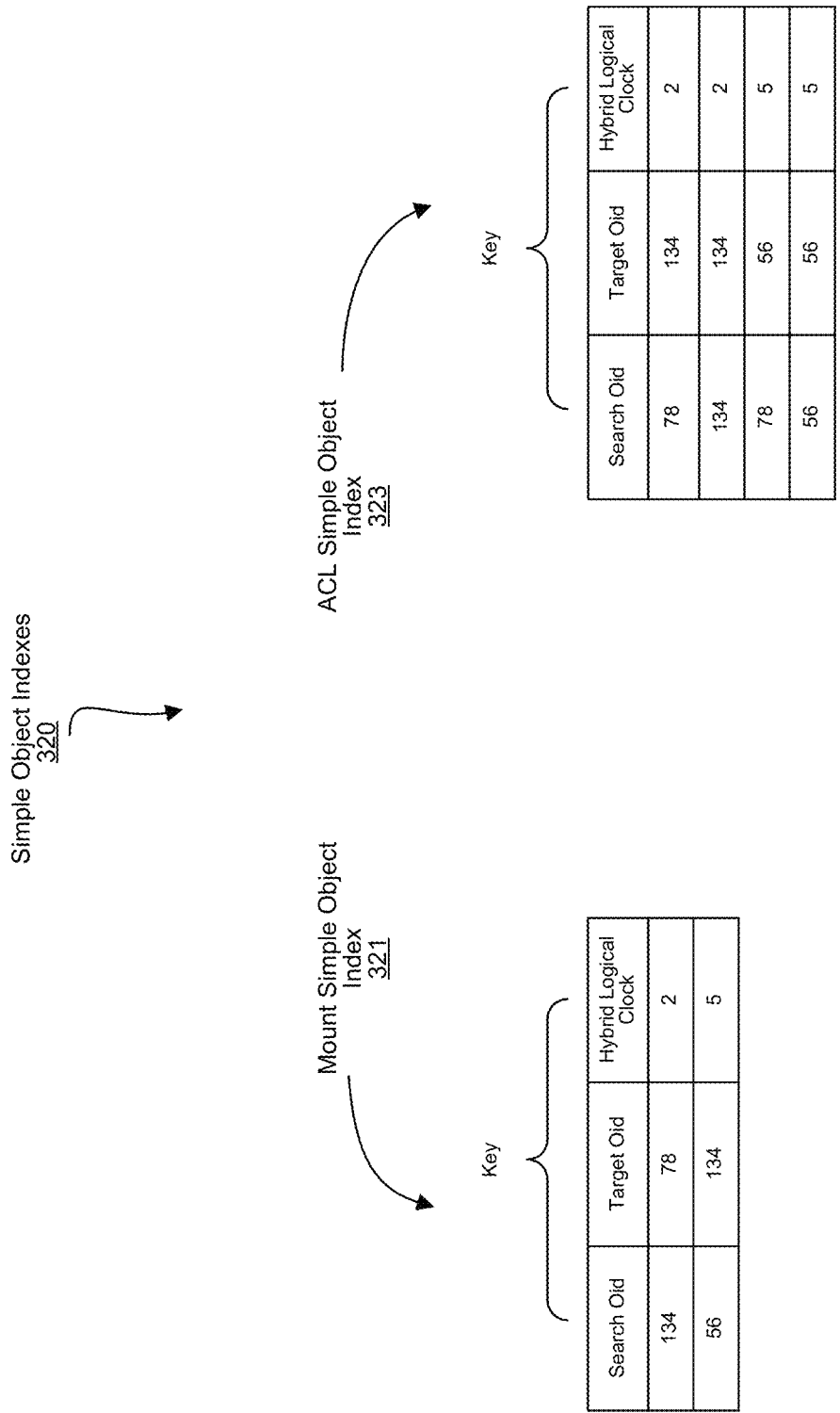
FIG. 8 illustrates an example of simple object index(es) in accordance with some aspects of the present technology.

FIG. 8 illustrates an example of simple object index(es) 320, which is part of objects database 148. A simple object index 320 is an index(es) in which a row is written into the index whenever a particular condition is satisfied. As such a search of a simple object index 320 will yield a result or null indicating that the particular condition was satisfied for the searched object ID, or a particular condition was not satisfied for the searched object ID.

There can be several simple object indexes 320. For example FIG. 8 illustrates a mount simple object index 321 and an ACL simple object index 323. In order to be included in a query result of mount simple object index 321 a given object ID (the search oID) needs to have been mounted in the target oID. In order to be included in the ACL simple object index 323, a permissions change needs to have occurred for the search oID or to a child of the search oID. The oID to which the permissions change occurred is the target oID.

Mount simple object index 321 can be searched by querying for all mounts of a search oID, which would return all mounts, the mount location (target oID) and the HLC that the mount took place. Mount simple object index 321 could also be searched for all mounts of a search oID in a specified HLC range.

ACL simple object index 323 can be searched by querying for all permission changes on or under a search oID, which would return all object IDs for any object experiencing a permission change on it or under it, the object ID to which the change was specifically applied (target oID) and the HLC at which the permission change took place. ACL simple object index 323 could also be searched for all permission changes on or under a search oID in a specified HLC range.

One use of such simple object index(es) 320 is to determine whether a particular event happened during a particular HLC range, and if it is determined that the event happened then more information about the event can be looked up in other data structures of objects database 148, subjects database 140, or further processing can be performed. For example, if the purpose of a search of permissions change simple object index 323 is to determine if a permission change has occurred on or under an object since the last time the object was accessed (as represented by an HLC value) by a subject, then when it is determined that a permission change has happened, information about the particular permission change can be retrieved and analyzed to determine whether the permission change affects access by the requesting subject as addressed further with respect to FIG. 13 and FIG. 14.

Queries of simple object index(es) 320 can also be more specific and can find a specific object ID at a specific HLC, if it is present in the index. For example, a query could request a search oID=<directory oID> AND hlc<=<query hlc> and group the results by (search oID, target oID). This finds exactly one row for each object under the directory that matches the criteria.

Figure 9:
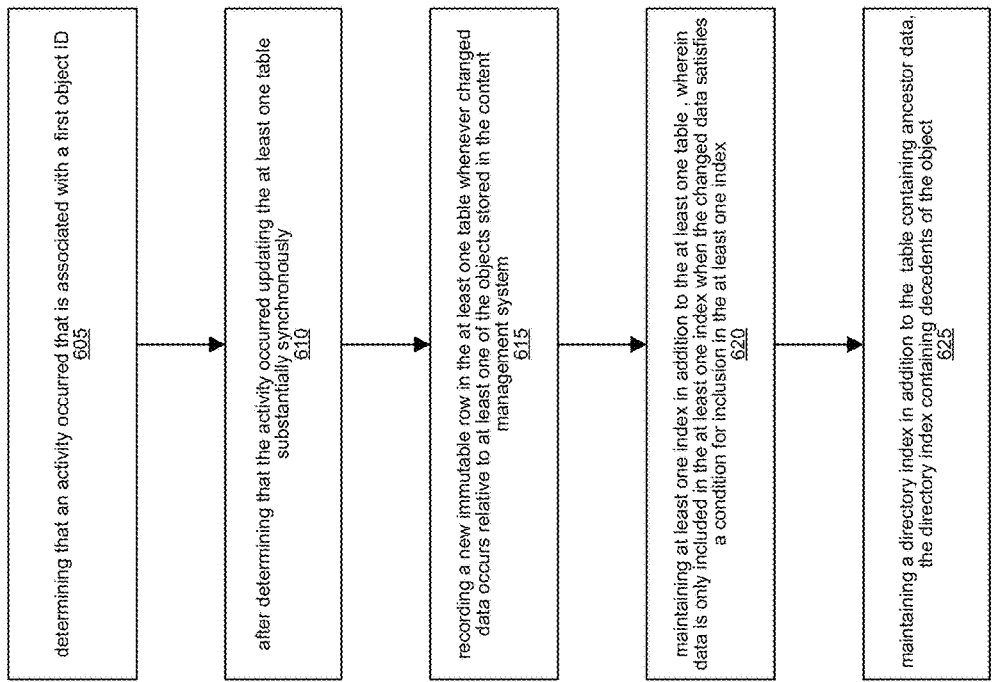
FIG. 9 illustrates an example method for maintaining the tables and indexes of an object database in accordance with some aspects of the present technology.

FIG. 9 illustrates an example method for maintaining the tables and indexes of objects database 148. Although the example method illustrated in FIG. 9 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, the method includes determining that an activity occurred that is associated with a first object ID at step 605. For example, object storage service 116 may determine that an activity occurred that is associated with a first object ID. The activity can be anything that modifies an object in some way including a change in permissions as it pertains to a Subject ID, or the inheritance properties of the object, a modification to the object including adding, deleting, moving, or modifying the object, and or a change in metadata associated with the object.

In some embodiments, after determining that the activity occurred, the method can update the at least one table substantially synchronously at step 610. For example, the object storage service 116 can update the at least one table substantially synchronously and then update at least one index of objects database 148 asynchronously. Objects database 148 is configured such that the tables are highly efficient and can be receive writes operations and read operations nearly as quickly as such writes and reads are requested. The tables, such as ACL table 202, object table 212, hierarchy table 222, and object data table 232 are all configured to contain only the minimum amount of data to perform their function, the data requires minimum amounts of processing before being written to a table. A single changed object only requires writing to a single row, and can only receive new data in the form of new rows, which allows these tables to be updated quickly. In contrast, the indexes such as aggregates index 305, directory index 315, simple object index(es) 320, etc. can have associated queues for data waiting to be written to these indexes. As such these indexes can be updated asynchronously. Writing to the indexes can involve additional processing of data, and can involve writing many new rows when only a single object has an associated activity, which can take additional time.

In some embodiments, the updating (610) the table includes recording a new immutable row in the at least one table whenever changed data occurs relative to at least one of the objects stored in the content management system at step 615. The new row can include the object ID for the at least one of the objects stored in the content management system to which the changed data has occurred and data pertaining to the changed data.

In some embodiments, the at least one table can include at least an object ID referencing a specific object for which data in a respective row in the at least one table pertains. In some embodiments, the at least one table can include a clock value (e.g., hybrid logical clock value or date and time, or other clock value, etc.) recording a system time in which the changed data relative to the specific object represented by the ID occurred. In some embodiments, the at least one table can include object type data for the specific object represented by the ID. In some embodiments, the at least one table can include access capability and permission data for the specific object represented by the ID. In some embodiments, the at least one table can include an ancestor object ID referencing a second specific object that is a direct ancestor of the specific object represented by the ID.

In some embodiments, the at least one table can include a first object table containing the access capability data. In some embodiments, the at least one table can include a second object table containing object activity data including the object type data. In some embodiments, the at least one table can include a third table containing ancestor data including the second object ID referencing the second specific object that is a direct ancestor of the specific object represented by the ID. In some embodiments, each table can be indexed by at least the object ID and the clock value fields.

As addressed above, the tables in objects database 148 are configured to be highly efficient and store only minimally descriptive data effective to perform its intended function. The minimally descriptive data does not include data that can otherwise be derived from other data in a table. For example, the minimally descriptive data does not include a description of an action resulting in the changed data for the specific object. As will be addressed later, such as in FIG. 19, it is possible to determine if the action on an object was an edit, a move, a new object, an access change, etc. The at least one table includes minimally descriptive data sufficient to provide a source of truth for the content management system.

In some embodiments, the database (objects database 148) containing at least one table is distributed over a plurality of database shards including a first database shard, and the content management system stores a subset of the objects stored in the content management system on the first database shard, and the changed data for the subset of the objects stored on the first database shard are stored in a first portion of the at least one table also stored on the shard. For example, if an object, such as oID=345 (which is a file object as shown in FIG. 3) is stored on a first shard, all entries pertaining to object 345 will occur in a portion of objects database 148 that is also saved on the same shard. In some embodiments, object storage service 116 can be configured to store all objects under a root directory on the same shard, and therefore all entries into object database for that root directory, and its children directories and files will be stored in a portion of the object database that is also stored on the same shard.

As addressed above, objects database 148 also includes indexes. In some embodiments, the method includes maintaining at least one index in addition to the at least one table at step 620. In some embodiments, data is only included in the at least one index when the changed data satisfies a condition for inclusion in the at least one index. This is in contrast to updating of tables, wherein data is included in the at least one table whenever any changed data occurs relative to the specific object. While the at least one table can be divided into tables with a specific purpose, at least one of these tables will be updated for any change data relative to an object. This is not necessarily the case with an index. A change can occur on an object that is not reflected in any index. A new row can be written into an index when a condition for inclusion in the index is satisfied.

For example, data can be written to a directory index in addition to writing data into the table containing ancestor data (e.g., hierarchy table 222). The directory index contains descendants of the specific object by identifying an object ID for a direct descendant of the object at step 625. In order to be included in the directory index a change needs to occur which causes a descendant of an object to be added or deleted. Other changes to an object are not included in the directory index.

FIG. 10A illustrates an example method determining that an activity occurred that is associated with a first object ID. Although the example method illustrated in FIG. 10A depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, the method includes identifying the first object ID in the at least one index at step 640. For example, the object storage service 116 can query a simple object index 320 to attempt to identify the first object ID in the at least one index. A condition for inclusion of the object ID in simple object index 320 is that the activity occurred. Therefore, when a query of simple object index 320 results in an identification of the first object ID during a specified time range (HLC value or range), then it can be concluded that the activity occurred.

In some embodiments, the method includes retrieving, from the at least one index, a first system time in which the type of activity occurred at step 645. For example, the object storage service 116 may retrieve, from simple object index (es) 320, a first system time (HLC value) in which the type of activity occurred. While the query can identify a range represented by HLC values, the actual HLC value in which the activity occurred is not known. Therefore, one purpose of the query of simple object index 320 is to learn when an activity occurred, if the activity occurred at all.

The method further includes querying the at least one table using the first object ID and the first system time to retrieve additional data pertaining to the first object ID at the first system time at step 650. For example, the object storage service 116 may use the HLC value(s) retrieved at step 645 to query the at least one table in objects database 148 to retrieve additional data pertaining to the first object ID at the first system time.

For example the method illustrated in FIG. 10A can be used to query ACL simple object index 323 for object 556 for a range of HLC values from HLC 1-100, which would return that ACL changes occurred for this object at HLC=5 and HLC=99. Object storage service 116 can then query ACL table 202 by object ID and HLC value to learn specific details regarding the ACL changes.

FIG. 10B illustrates an example method for constructing a representation of a directory tree for a subject account at a specified time. Although the example method illustrated in FIG. 10B depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments the specified time can be a most current version of the directory tree. In some embodiments, the specified time can refer to a directory tree at a previous point in time.

In some embodiments, the method includes receiving a request to represent a directory tree at a specified time at step 660. For example, the object storage service 116 may receive a request to represent a directory tree at a specified time.

In some embodiments, the method includes accessing directory index 315 of objects database 148 to identify ancestors of the object by first identifying the direct ancestor of the specific object during the specified time at step 665.

Thereafter object storage service 116 can recursively identify (670) a further next ancestor of the direct ancestor until no further direct ancestors are available by making (675) the direct ancestor a query object ID to retrieve a next further ancestor of the specific object. Each identified ancestor can then be included (680) in a tree of ancestors built from the recursive identification (670) of further ancestors until no further direct ancestors are available (all leaf nodes are reached).

Figure 11:
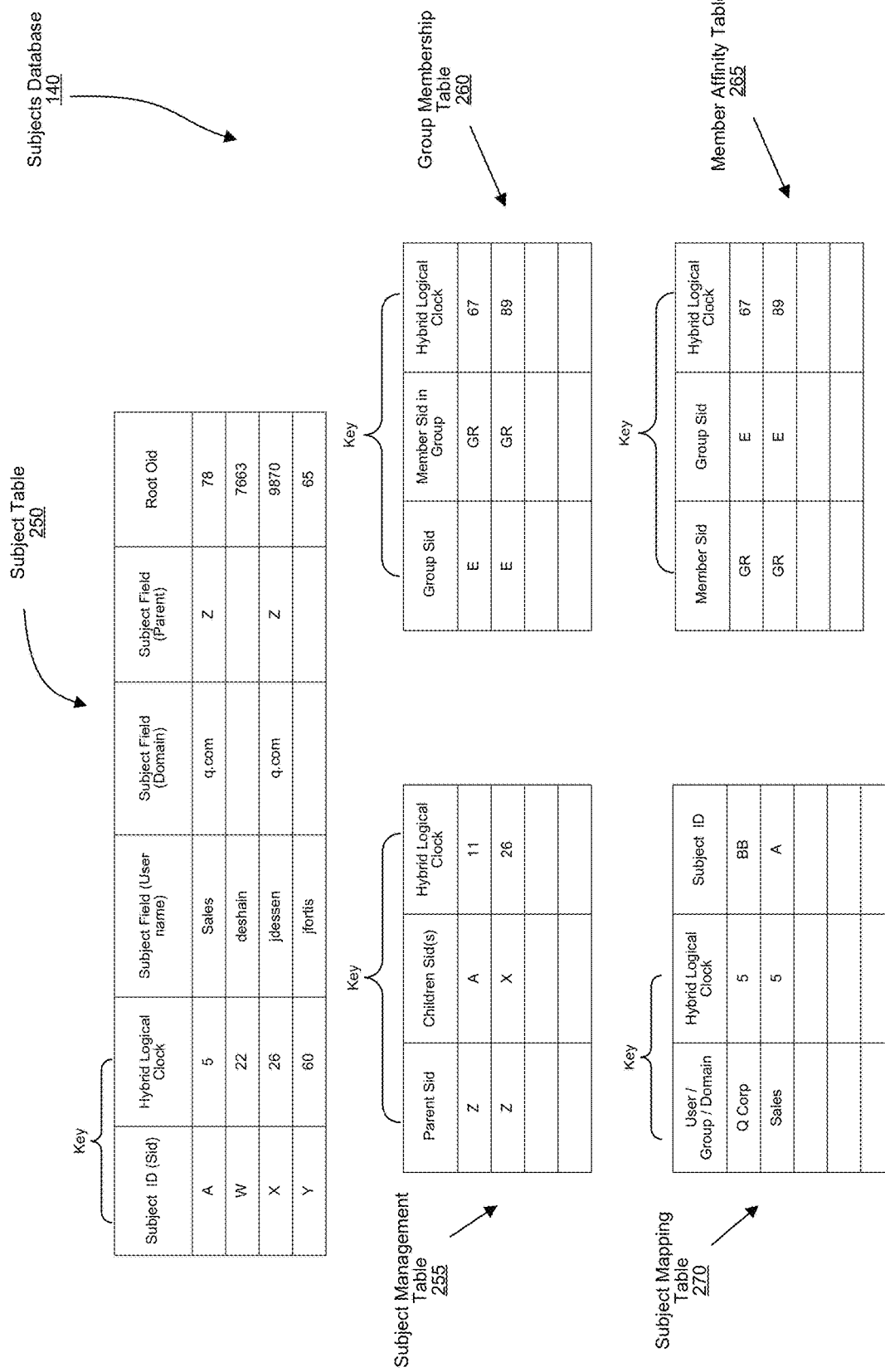
FIG. 11 illustrates subject database in accordance with some aspects of the present technology.

FIG. 11 illustrates subjects database 140. While in FIG. 2 subjects database 140 is shown as being stored outside of object storage 142, it will be appreciated that in some embodiments subjects database 140 can be stored across shards 142*n* of object storage 142 just as with objects database 148.

Subjects database 140 is configured to track essential information about the subject. The subject can be any entity that might have an account with content management system 110 and/or that can have access to or take action on an object. Subjects database 140 can be broken into several different tables including a subject table 250, a subject management table 255, group membership table 260, member affinity table 265, and subject mapping table 270.

Subject table 250 is configured to record information about a subject which is represented in subject table 250 as a subject ID (sID). A new row can be written into subject table whenever a sID comes into existence, a sID is deleted, or some other aspect of the data recorded in subject table 250 is changed.

In addition to the column of subject table 250 containing sIDs, subject table 250 also contains a column for hybrid logical clock (HLC) that can record a system time in which the change causing the row was affected. Subject table 250 also contains various subject fields which record information about a subject account represented by that sID. For example, subject table 250 can also contain a subject field for a subject name associated with the subject account, or an email address associated with the account. In some embodiments, subject table 250 can also record whether the subject account belongs to a particular domain. For example, if the subject account is associated with an organization that also has a subject account with content management system, subject table 250 can record the mapping between the subject account and its domain.

Subject table 250 also includes a column indicating whether a subject ID is managed or controlled by a parent subject ID. Just as objects can have ancestors from which an object can inherit certain properties a subject can also have a parent. A parent of a subject can be a subject account that has the authority to manage the subject such as by giving restrictions or permissions to the subject. In some embodiments, a subject can also inherit certain properties from a parent subject.

Subject table 250 also includes a column denoting a root object ID. In some embodiments, every subject account represented by a sID can be associated with its own private directory which can appear as the root of its account. At the same time, other root objects can be mounted in the directory structure for the subject account below the root object for that subject. For example, the subject account may have a root directory called "root subject" and at the same time that subject account may be part of a group. The group itself may have its own root directory called "group". The group root directory can be mounted below the root directory for the subject such that a directory structure might look like "/root subject/group." In other cases, if the subject account is strictly tied to a subject account of an organization the root of the subject account may appear below the root of the organization. For example, if the organization has a root directory called "organization", the directory structure for the subject might look like "/organization/root subject". The specific relationship between one root directory and another root directory is purely one of implementation. However, these examples illustrate that each subject account has its own root directory and that any root directory can be mounted within another root directory such that it appears subordinate to another directory even though it is the root of a subject account.

Subject table 250 is queried by receiving an identification of a sID and a range of HLC values and such queries can return any information shown in another column of subject table 250. While limited fields are illustrated as columns in subject table 250 it will be appreciated by those of ordinary skill in the art that additional fields can also be included.

Subjects database 140 also includes subject management table 255, which records a relationship between a parent account (sID) and is child accounts (sID). As mentioned above, subject accounts can have a hierarchical relationship to one another such that one subject account can have management authority over one or more children accounts. A new entry in the table can be added every time a relationship between a parent account and a child's account is created or deleted. Subjects database 140 can be queried by receiving a parent sID value which will return all children sIDs and the HLC values for which a change in the relationship between the children and the parent took place.

Subjects database 140 also includes group membership table 260, for which an entry can be made into the table every time a member is added to or removed from a group. For example, in the top two rows illustrated in group membership table 260 a change in membership of group E is recorded. At HLC=67 member GR is added to group E, while at HLC=89 member sID=GR is removed from group E. Group membership table 260 can be queried by providing a sID of the group account, and the query will return all member sIDS and the hybrid logical clock values for when the change in the relationship between the member sID and the group occurred.

Subjects database 140 also includes member affinity table 265, which records a relationship between a subject and the groups to which it belongs. In some embodiments, member affinity table 265 is an inverse of group membership table 260 such that whenever a row is written in group membership table a corresponding row will also be written in member affinity table 265. Member affinity table 265 can be queried by providing a member account sID and the query will return all groups to which the member has been added or removed or for which the relationship between the member and the group is changed in the HLC value of that change.

Subjects database 140 also includes subject mapping table 270 which maps information also found in the various subject fields of subject table 250 to a sID. Subject mapping table 270 can be queried by providing some information about a subject such as the subject account name and a range of HLC values and will return a subject's ID. This is the inverse of a lookup thing can be performed in subject table 250 wherein the subject's ID is provided and information about a subject account name or domain or other information can be retrieved. Note a subject's ID is not the same as a sID. A subject's ID is a user name or account name that might be used to login to content management system 110, whereas a Sid is a value used by content management system 110 to refer to the subject account.

Figure 12:
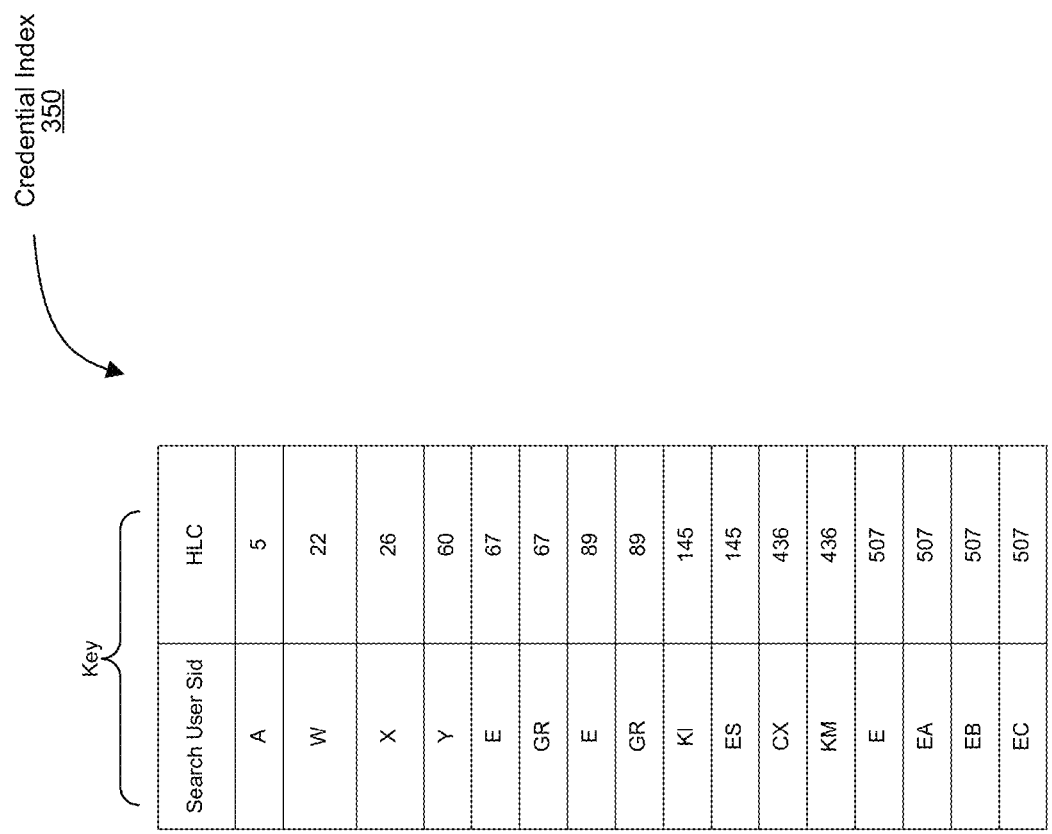
FIG. 12 illustrates credential index in accordance with some aspects of the present technology.

FIG. 12 illustrates credential index 350, in accordance with some embodiments. Credential index 350 is used to catalog any time a subject's membership to another subject has changed. For example, credential index 350 shows sID=A was the subject of a change at HLC=5, which was the result of subject A being created and added to subject table 250 at that time. Subjects W, X, and Y are all listed in credential index 350 for the same reason. Credential index also shows that sID=E, which represents a group, received an access change at HLC=67. That access change was when subject sID=GR was added to the group, and sID=GR is also shown in credential index 350 at HLC=67. Likewise, when sID=GR is removed from group sID=E at HLC=89 changes to group sID=B and sID=GR are reflected in credential index 350. At the bottom of credential index 350, at HLC=507 entries are listed for sIDs=E, EA, EB, EC, which collectively reflect that sID=E has been given access to a new object, and thereby the members of group sID=E (EA, EB, EC) are also listed in credential index 350 since the groups they belong to have changed. (Note that in ACL table 202 the addition of sID=E2 at oID=899 is also reflected).

Figure 13:
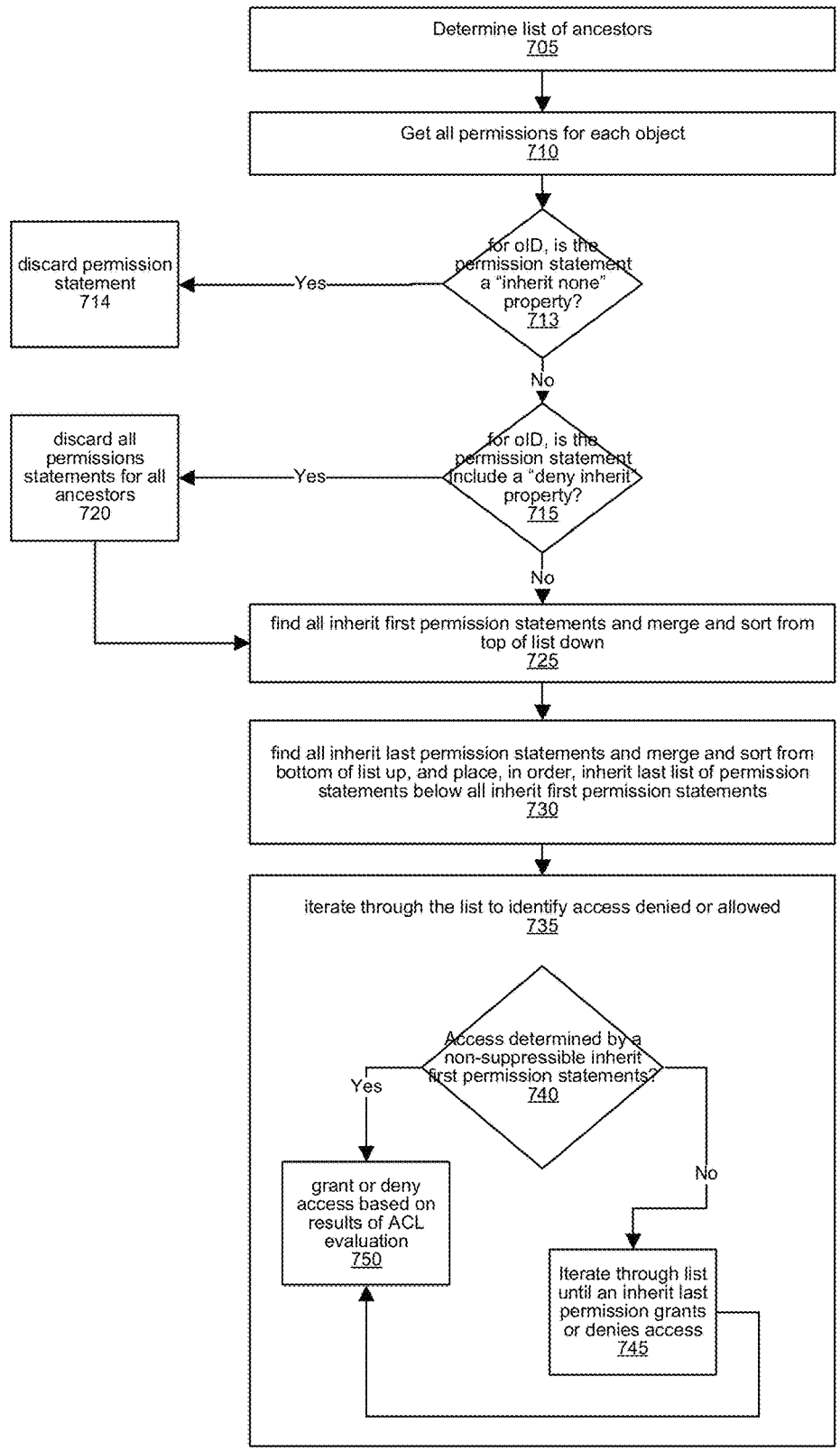
FIG. 13 illustrates an example method for evaluating an access control list composed from individual permission statements for an object in a directory tree in accordance with some aspects of the present technology.

FIG. 13 illustrates an example method for evaluating an access control list composed from individual permission statements for an object in a directory tree. Although the example method illustrated in FIG. 13 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As addressed above, a complete access control list for any object does not persist in content management system 110. Instead, an ACL list for a particular object is a vector of all permissions statements recorded in ACL table 202 for all objects in a directory tree above the particular object. The method illustrated in FIG. 13 first determines a list of ancestors above the particular object and then composes and evaluates the ACL.

It can be necessary to determine a subject's permissions as defined by the ACL for the object when a client acting on behalf of a subject account requests access to an object or requests to write to objects database 148 and object storage 142.

In some embodiments, the method includes determining a list of ancestors of a specified object ID at step 705. For example, the object storage service 116 may determine a list of ancestors of the object ID. In an example, the determining a list of ancestors may include recursively performing several steps including: retrieving a next ancestor object ID by looking up a query object ID (starting with the specified object ID) in a table containing ancestor data, building the list of ancestors by adding the next ancestor object ID as an ancestor to the query object ID, and making the next ancestor ID the query object ID. This recursive process of building the list can complete when a root of the tree is reached.

In some embodiments, for the purposes of determining an access control list for an object, a tree can include roots not accessible by the subject account. The recursive process of building the directory tree can build a directory tree that has multiple roots, or even multiple trees that do not cross. This is a result of the ability of content management system 110 to share objects that are stored below a root object to which the subject does not have access. This is illustrated and addressed further with respect to FIG. 15.

In some embodiments, when an object has a root not accessible to the subject account, access will be determined only by going up to a root of a directory tree as it appears in a subject account.

In some embodiments, the method includes obtaining access permissions for each object ID in the tree of ancestors at step 710. For example, object storage service 116 may obtain a permission statement for each object ID in the tree of ancestors from the ACL table 202. As addressed above, an access permission for an object defines at least a subject to which the access permission applies, a capability granted to the subject, a permission given to the subject (allow, deny, etc.) for the object, and an inheritance property for the access permission.

In some embodiments, the method includes ordering permissions statements into an ordered list according to inheritance properties of the respective permissions statements. A particular permission statement can have the inheritance property of "first" and can be non-suppressible, whereby any subsequent permissions statement in the ordered list of permission statements cannot override the particular permission statement. A particular permission statement can have the inheritance property of "first" and can be suppressible, whereby any subsequent permissions statement in the ordered list of permission statements can override the particular permission statement. Any permission statement having an inherit first property will be sorted to the top of the ordered list unless a subsequent permission statement requires that it is removed. A particular permission statement can have an inheritance property of "last" and these permission statements will be sorted to the end of the ordered list. A particular permission statement can have an inheritance property of "inherit none" and no permission statement will appear in the ordered list. A particular permission statement can have an inheritance property of "deny inherit" where the object ID will not inherit any permissions from its ancestors unless the permissions statement of an ancestor is "first" and "non-suppressible."

Object storage service 116 can determine (713) whether the obtained permission for any object in the directory tree includes an inheritance property of "inherit none," and if so, object storage service 116 can discard (714) the permission statement for that object. A property of "inherit none" only applies to the particular object ID to which is is associated and does not affect whether any ancestor or descendant policies are merged and sorted into the list.

Object storage service 116 can determine (715) whether the obtained permission for any object in the directory tree includes an inheritance property of "deny inherit," and if so, object storage service 116 can discard (720) permission statements from all ancestors (objects above the object ID with the property of deny inherit in a directory tree) unless the inheritance policy is a non-suppressible, inherit-first policy. Discarded permission statements are not merged and sorted into the list.

With the remaining permission statements, object storage service 116 can perform a merge and sort of these permission statements to order them appropriately for evaluation. The ordering of the permission statements can include determining (725) that a permission statement for an object ID in the obtained permission statements has an inheritance property of "first." Object storage service 116 can arrange the permission statements having an inheritance property of "first" above the permission statements having an inheritance property of "last" in the ordered list of permission statements by merging and sorting these permissions from a top of a list down, where each permission is included in the list in the order in which it appears from top to bottom in the directory tree.

The ordering of the permission statements can further include determining that a permission statement for an object ID in the obtained permission statements has an inheritance property of "last." Object storage service 116 can arrange (730) the permission statements pertaining to an ancestor of the object ID having a permission statement with the inheritance property of "last" in the ordered list of permission statements by merging and sorting these permissions in the inverse relative order as their respective ancestors are arranged in the tree of ancestors. In other words, an access permission for an object at the bottom of the directory tree will be placed in the ordered list of permission statements above a permission statement for an object that is located higher in the directory tree. However, all of the inherit "last" access permissions will be placed into the ordered list below access permissions with an inherit "first" permission statement. The ordered list of all access permissions for an object can be considered the access control list (ACL) for the object.

In some embodiments, the method includes iterating through the ordered list of permission statements, in order, until a permissions statement grants or denies access to the object at step 735. For example, the object storage service 116 may iterate through the ordered list of permission statements, in order, to determine whether access should be granted or denied.

In some embodiments, the iterating through the list can terminate when a permissions statement grants or denies access. If a inherit first permission can be suppressed, then it can be necessary to at least iterate through the tree until one of the inherit "last" permissions statements provides or denies access. Therefore, determining whether access should be granted or denied includes determining (740) whether access is granted or denied by a non-suppressible inherit first permission. If a non-suppressible permissions statement does not resolve the access determination, then object storage service 116 can evaluate (745) the rest of the ordered list of permission statements until an inherit last permissions statement grants or denies access, and can grant or deny (750) access based on the results of the ACL evaluation.

In some embodiments, suppressible inherit first access policies can also be handled by noting whether those policies are suppressed by an inherit last policy associated with an object elsewhere in the tree. In such instances, the suppressed inherit first access policy can be excluded from the merge and sort (725) and the list of permission statements can be evaluated using straightforward iteration (735)

of the list of permission statements without regard for the sub method made up from steps 740, 745, and 750.

In some embodiments, the output of FIG. 13 can be a list of capabilities to any evaluated object.

Figure 14:
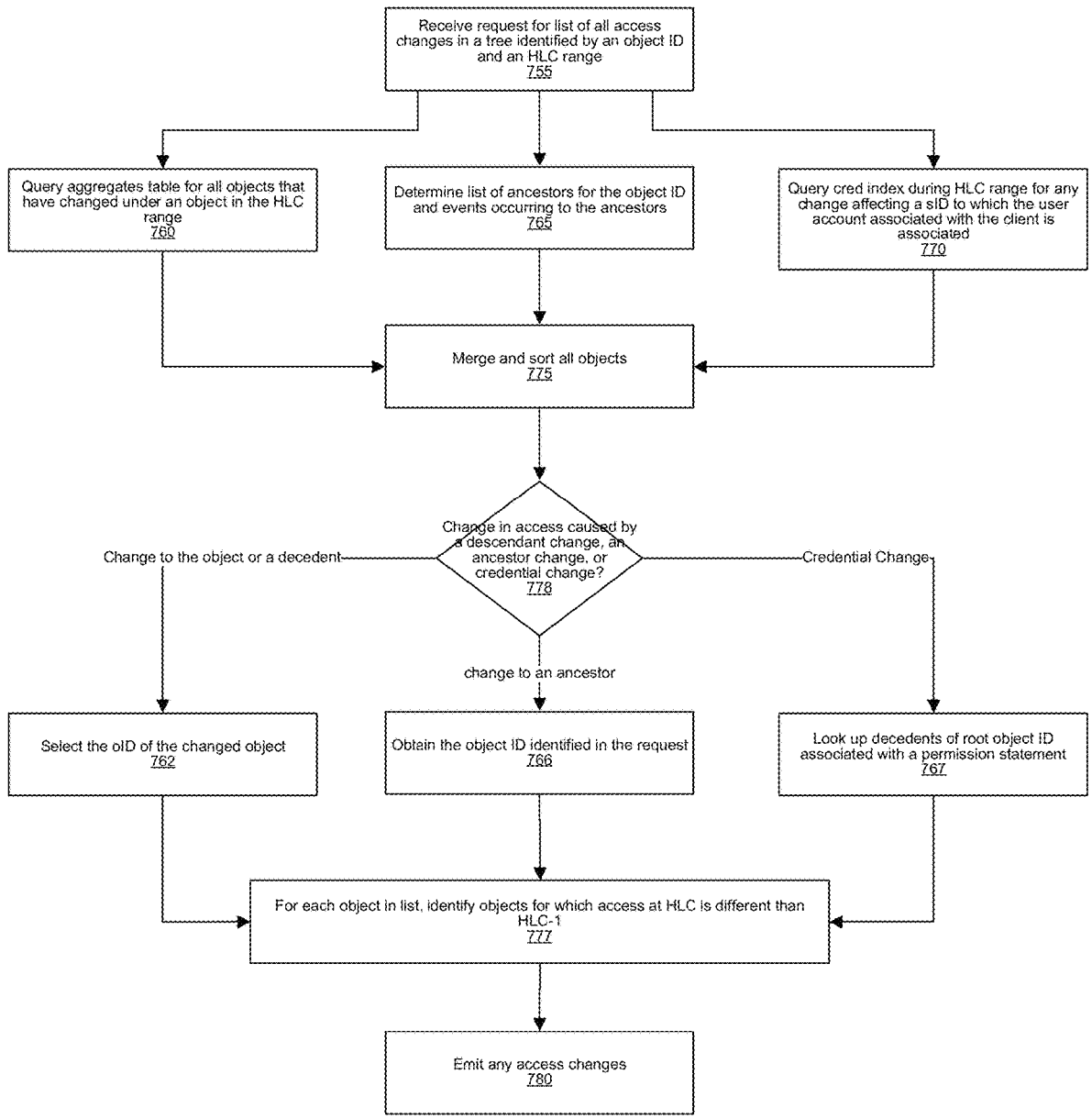
FIG. 14 illustrates an example method for determining that a change in access has occurred with respect to a subject account, and sending notifications regarding the change in access in accordance with some aspects of the present technology.

FIG. 14 illustrates an example method for determining that a change in access has occurred with respect to a subject account for an object ID that is part of a query. Although the example method illustrated in FIG. 14 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

One advantage of the present technology is that changes in access are checked when a client requests access to an object. In this way, as soon as an access change occurs it will immediately affect a client's access because the next time the client makes a request for access, permissions are checked. Accordingly, clients need an ability to learn of access changes that may have occurred since a previous access request. FIG. 14 illustrates an example method for determining changes in access in a period of time for an object ID or its descendants. Often object storage service 116 can carry out the method illustrated in FIG. 14 when a client requests access to an object ID. While one use of the method in FIG. 14 is to determine any access changes since a previous access request, FIG. 14 can be used to determine any access change during any period of time.

FIG. 14 illustrates an example method for determining access changes during a period of time. The method illustrated in FIG. 14 begins when object storage service 116 receives (755) a request from a client. The request will identify an object ID for a directory object of interest and an HLC range. In some embodiments, the HLC range will correspond to the last time the client accessed the object ID prior to the present time, but it is possible to request any HLC range to identify historical access changes. The method illustrated in FIG. 14 will return any changes in access for the object of interest and any descendant objects during the HLC range.

Access changes can be created by a variety of events occurring in the content management system. For example, access changes can result from an ACL change in the descendants of an object ID for the directory of interest, an ACL change in the ancestors of the object ID for the directory of interest, a move of an ancestor of the object ID for the directory of interest that changes permissions, or a group change (where a subject ID associated with the requesting client has been added or removed from a group, or a group has gained or lost access), etc. For this reason, three different streams of data need to be accessed and evaluated.

A first stream is for descendant objects of the queried object ID. As such object storage service 116 can query (760) aggregates index 305 for all changes made under the queried object ID to learn of all object IDs that have changed during the specified time range. All object IDs that are returned from this query should be associated with some change.

A second stream is for ancestor objects of the queried object ID. As such, object storage service 116 can determine (765) a list of ancestors for the queried object ID by querying hierarchy table 222 to retrieve a list of ancestors, and can identify any events that occurred with respect to those ancestors. For example, if there are ten ancestors, object storage service 116 can query object table 212 to identify events that happened to the ancestors during the relevant period. The ancestors are important because a change in access for one of these objects can cause a change for the queried object by virtue of inheritance from inherit last or inherit first policies.

A third stream is to determine what access changes have occurred at the subject level—i.e., what access changes have occurred to any subject ID to which the user account is associated. For example, if a change in access has occurred with respect to the user account directly, or any team to which it is associated, this may also affect access to the queried object ID and its descendants. As such, object storage service 116 can query (770) cred index 350 for the HLC range for any change affecting a subject ID to which the user account is associated.

Object storage service 116 can then merge and sort (775) the data from all three streams into a list arranged in HLC order. Therefore, the merged and sorted (775) list includes both object IDs and subject IDs since the first two streams of potential access changes returns objects and the third stream returns subjects.

Object storage service 116 evaluates the merged and sorted list by iterating through the list in HLC order. For any entity in the merged and sorted list, object storage service 116 must further evaluate the character of the change to the entity in the list. The method by which the further evaluation must occur is dependent on the type of change that occurred. At node 778, object storage service 116 determines if the change in access was caused by a change to a descendant object, a change to an ancestor of the object in the directory tree, or a credential change. In some embodiments, object storage service 116 can determine (778) the source of the change in the merged and sorted list by recording the source of the entity in the merged and sorted list.

When the access change was caused by a change to the object or one of its descendants in the merged and sorted list, object storage service 116 can select (762) the oID of the changed object and pass the oID to the next step, which is to determine (777) whether permissions have changed on the oID in the relevant time range as will be addressed in more detail below.

When the access change was caused by a change to the ancestors in the merged and sorted list, object storage service 116 can obtain (766) the object ID from the request (755) and this is used to determine (777) whether permissions have changed on the object ID identified in the request received at block 755 in the relevant time range as will be addressed in more detail below.

When the access change was caused by a change in credentials (a change in the groups the subject ID is a member of) for the subject ID, object storage service 116 can look up (767) all objects in the directory tree that are associated with a permission statement by querying the hierarchy table 222 (to identify the ancestors) and the ACL table 202 (to identify ancestors associated with permissions statements). The relevant directory tree is based on the oID identified in the received request (755). This is similar to step 705 in FIG. 13.

Each of steps 762, 766, and 767 results in identifying objects that might cause a change in access to the object ID identified in the request received at block 755 or a descendant of that object ID. Step 762 individually identifies descendants that may have had an access change and step 766 outputs the object ID identified in the request received at step 755 when a possible change in access to the object ID was caused by an ancestor, while step 767 will produce a list of object IDs to evaluate where these object IDs might affect an access change to the object ID in the request or one of its descendants. For each of these objects, objects storage service 116 must determine if there has been a change in access. Object storage service 116 can query ACL table 202 for each object to determine (777) if any object ID has different access during the queried time range (HLC) as compared to just before the relevant time range (HLC-1). Step 777 is similar to the method illustrated in FIG. 13 except that in step 777 in FIG. 13 is repeated for every object output from steps 762, 766, and 767 at both HLC and HLC-1.

In some embodiments, some data determined as part of the evaluations that are part of step 777 can be cached to be utilized in further calculations.

If the result of step 777 is that an access control list has changed for the object, object storage service 116 can emit (780) a change that identifies the changes that resulted in the change in access and can emit the new capabilities defined by the access control list for the object.

Figure 15:
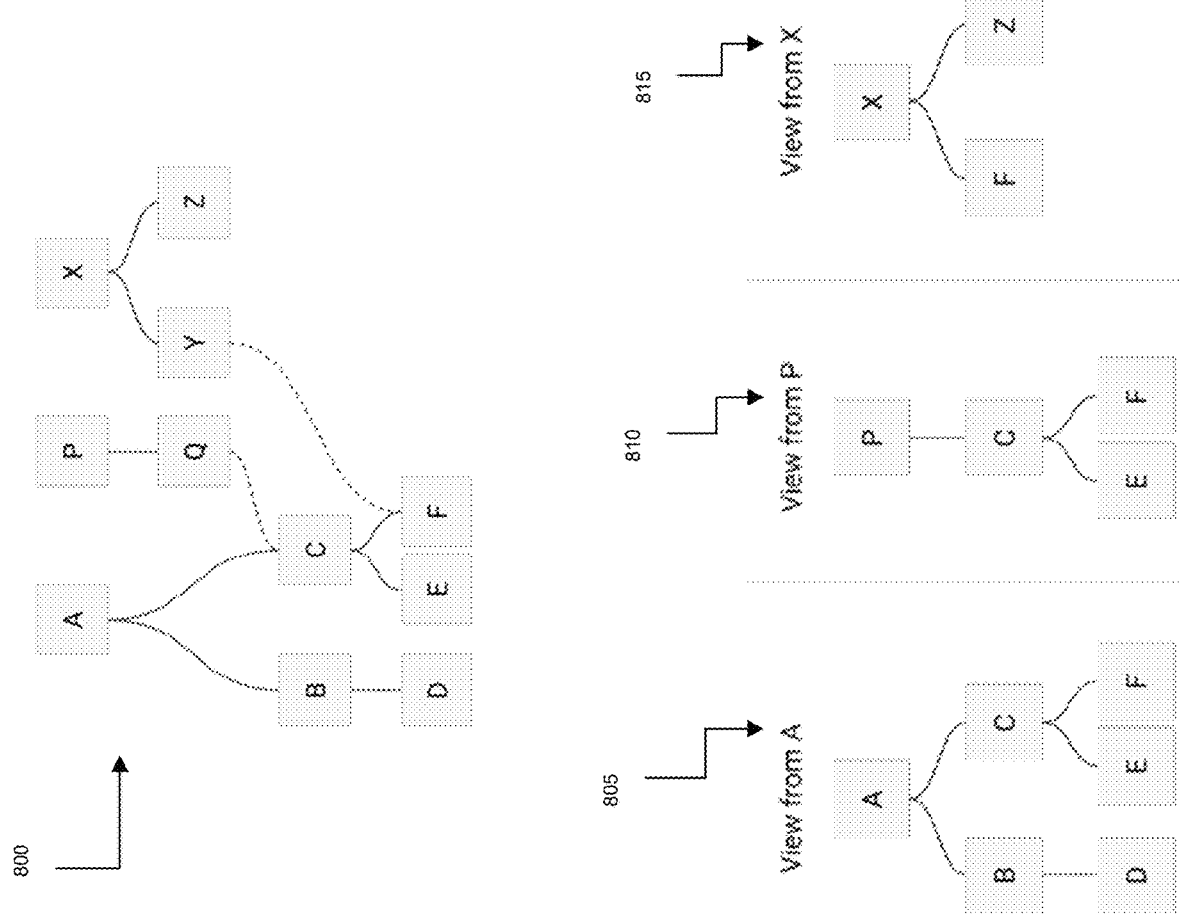
FIG. 15 illustrates an organization of objects up to their respective roots, and illustrates how an object below a root can be shared and appear to some subjects as mounted under a different root in accordance with some aspects of the present technology.

FIG. 15 illustrates an organization of objects up to their respective roots, and illustrates how an object below a root can be shared and appear to some subjects as mounted under a different root. One advantage of the present technology is that any object can be mounted under any other object. However, this can result in complicated tree structures and content management system 110 such as the one illustrated in FIG. 15. For example, directory structure 800 illustrates an example having three root directory objects (A, P, and X). While directory structure 800 represents a directory structure in content management system 110, different subject accounts can perceive the directory structure differently as shown in view 805 from subject A, view 810 from subject P, and view 815 from subject X.

Object F is a descendent of root directory object A and subdirectory object C, and object F has been shared with subject X under root directory object X. Object C is a descendent of root directory object A, and object X has been shared with subject P under root directory object P. Objects Q and Y are reference objects where object Q references object C and object Y references object F. These reference objects are the mechanism by which an object mounted under one directory can appear to be mounted under a second directory. For example, while object Q is actually mounted under object P, it appears to subject P that object C is mounted under object P.

Subject A can view a directory structure under directory object A, which happens to appear the same way as which it is stored. However subject P can view a directory structure under directory object P, but subject P sees a distortion from the way it is stored. Subject P sees that objects C, E, and F are all stored under root directory object P even though those objects are actually stored under root directory object A. This is because object Q which references object C has the effect of making it appear that object C is in the place of object Q, and includes all objects in the directory structure under object C. Likewise subject X can view a directory structure under directory object X, but subject X sees a distortion from the way the objects under directory structure X are stored. Subject X sees that object F is stored under root directory object X even though that object is actually stored under root directory object A. This is because object Y which references object F has the effect of making it appear that object F is in the place of object Y.

When determining access privileges for object C or object F, object storage service 116 needs to construct a directory tree showing ancestors of object C and F respectively. The directory tree for determining access privileges is the objects actual directory tree going up to root directory object A. In this way access privileges for ancestor objects that are not accessible to a particular subject can influence their access to objects that appear mounted under their root directory.

When the change information is determined to be based in the addition of the subject to a group (764), object storage service 116 first needs to determine (780) to which objects the group has access. Object storage service 116 can determine which objects to which a group has access by looking up the object ID for a root of a subject in subject table 250. Thereafter, object storage service can evaluate (770) an access control list (ACL) for the object. Evaluation of the access control list for the object can involve composing the access control list as addressed with respect to steps 705, 710, 715, 720, 725, and 730 in FIG. 13. Since access to any object can be based upon permissions attached to its ancestor objects, and since any object can be mounted under any other object, even if is already a subdirectory of another directory tree, it can be necessary to build a tree (705) above the modified or newly mounted or moved directory object, and then compose an access control list by getting (710) all permissions for each object, and merging and sorting the permissions as in steps 715, 720, 725, and 730 of FIG. 13. Once a composed access control list (ACL) has been created, object storage service 116 can evaluate (770) the composed access control list to determine any restrictions on access to the object, and can then send (775) the clients an updated access token reflecting the permissions to the object and can subscribe the clients to receive notifications about future events on the object.

When the change information is determined to unmount or delete access to an object (766) from a directory object to which the subject account already has access, object storage service 116 can send (785) the clients an updated access token that removes or does not include permissions to the object and can unsubscribe the clients from receiving notifications about future events on the object.

When the change information is determined to be based on the removal of the subject from a group (768), object storage service 116 first needs to determine (790) to which objects the group has access. Object storage service 116 can determine which objects to which a group has access by looking up the object ID for a root of a subject in subject table 250. Thereafter, object storage service 116 can send (785) the clients an updated access token that removes or does not include permissions to the root object and its children and can unsubscribe the clients from receiving notifications about future events on the object and its children.

Figure 16:
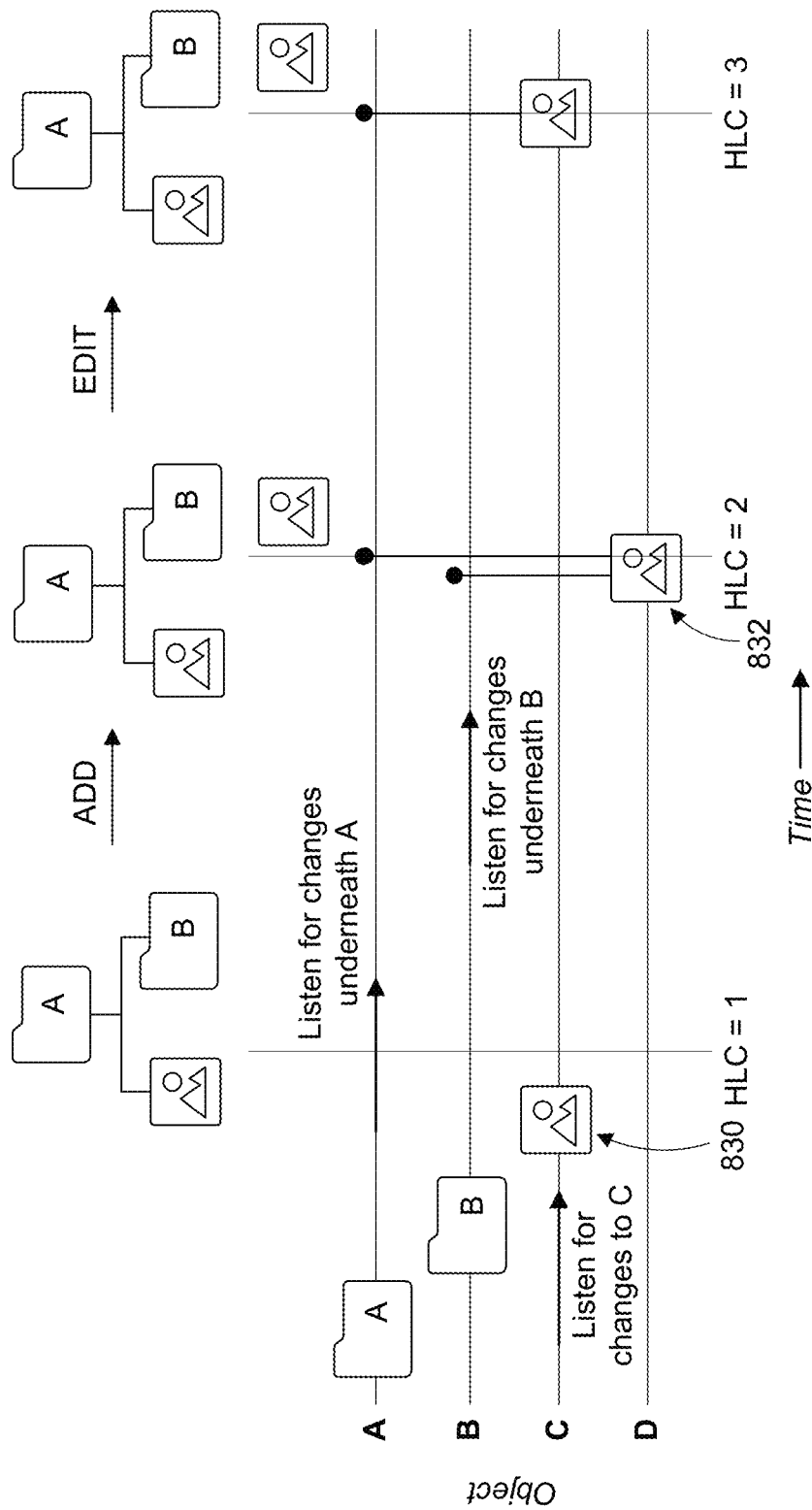
FIG. 16 illustrates a graphical example of the functioning of notifications pertaining to objects in accordance with some aspects of the present technology.

FIG. 16 illustrates a graphical example of the functioning of notifications pertaining to objects. FIG. 16 illustrates a portion of the directory having directory object A, directory object B, and content object 830, which are all in existence at time HLC=1. At this time a subject is registered to listen for changes occurring on or under directory object A, directory object B, and content object 830. At time HLC=2 content object 832 is added under directory object B, and therefore the subject can be notified of this change because the subject is registered to receive all changes happening under directory object A and directory object B. At the same time the subject becomes registered to receive notifications about all activity on content object 832. At HLC=3 content object 830 is deleted, and therefore the subject will receive a notification regarding the deletion of content object 830 and they will be unsubscribed receiving notifications about further changes to content object 830.

Figure 17:
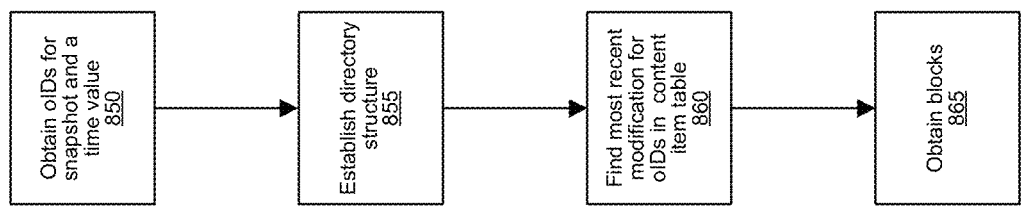
FIG. 17 illustrates a method of taking a snapshot of a directory at a particular time in accordance with some aspects of the present technology.

FIG. 17 illustrates a method of taking a snapshot of a directory at a particular time. Although the example method illustrated in FIG. 17 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

The method illustrated in FIG. 17 can be especially useful when the subject gets added to a directory, whether the subject gets added directly to the directory or the subject gets added to a group which has access to the directory. A snapshot can also be useful to view a directory as it existed at a past point in time, such as when a subject desires to roll back their directory to an earlier state. One advantage of the present technology is that it is able to produce a snapshot at any point in time. Many prior art systems can only provide historical snapshots at discrete points in time based on deltas from a previous point in time, or from imaging or backing up a directory at a point in time. However, since the present technology records all blocks that make up an object for every time an object is changed, it is possible to look up the blocks that were included in a directory at any historical period and retrieve the blocks.

To perform a snapshot, object storage service 116 can obtain (850) oIDs for a directory object to be snapshot at a particular point in time. If the subject was just added to a group directory at particular point in time, the point in time will be the most current time, or if the purpose of the snapshot is to view the directory at a past time, the point in time will be that past time.

Object storage service 116 can establish (855) a directory structure under the directory to be snapshot. If the directory includes other objects below the directory, object storage service 116 can also compile a tree of objects below the directory by recursively querying directory index 315 or by performing a depth first search of hierarchy table 222.

Once the tree of objects has been compiled, object storage service 116 can look up (860) the most recent entry for each object in object table 212 to identify blocks making up the object at the particular time. Collectively the directory structure and the data blocks making up each object is a snapshot of the directory at the particular time.

Object storage service 116 can then obtain (865) the blocks making up each object and send the snapshots to clients associated with the subject.

Figure 18:
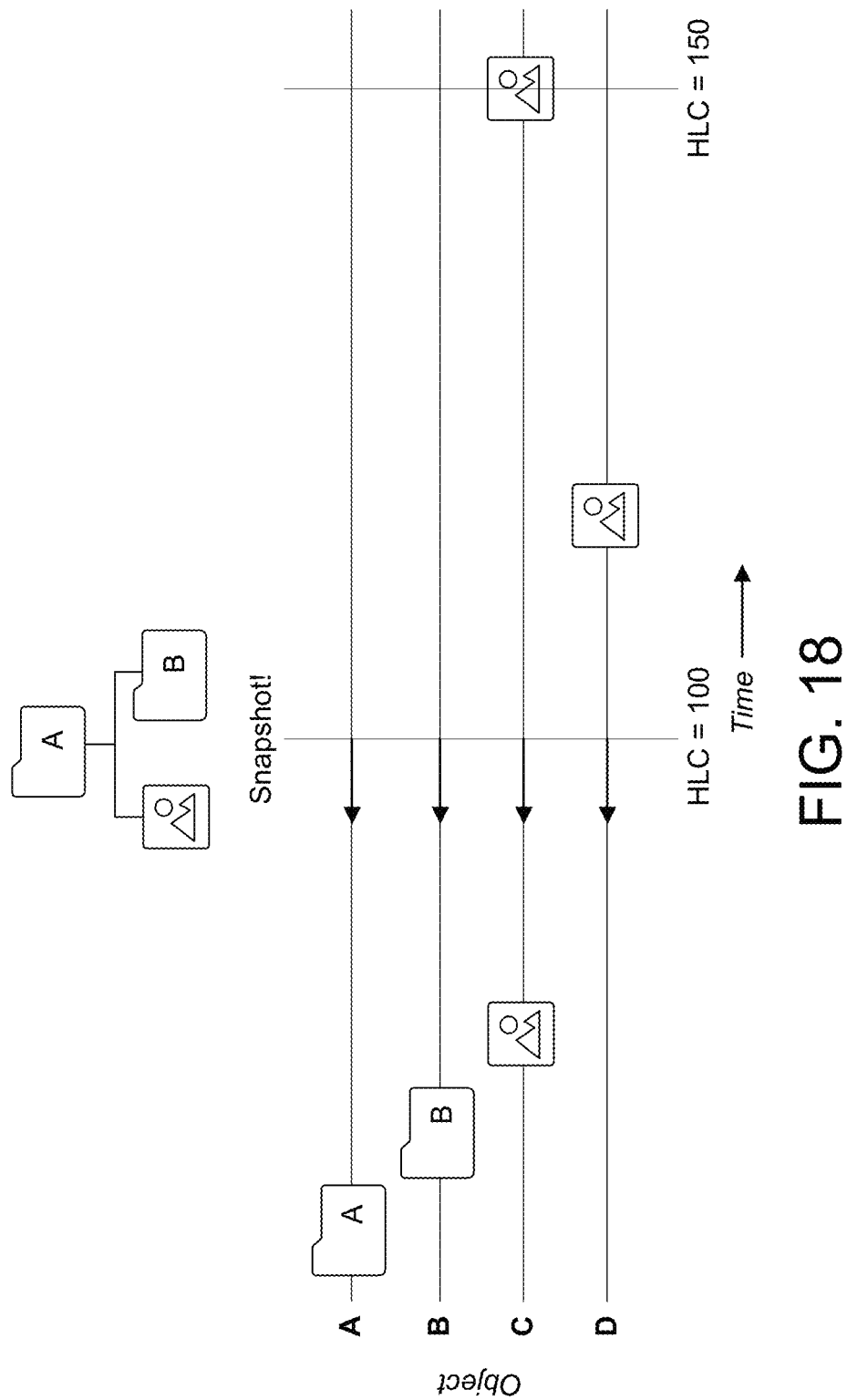
FIG. 18 illustrates an example of taking a snapshot at a past point in time in accordance with some aspects of the present technology.

FIG. 18 illustrates an example of taking a snapshot at a past point in time. As illustrated in FIG. 18 a previous time can be indicated by an HLC value (HLC=100). However, in FIG. 18 no changes have happened exactly at that specified HLC value, so the search of object table 212 identifies a most recent entry before the specified time in object table 212 for each specified object. This will result in a snapshot of that object at the specified time because it is known that no change has occurred between the most recent entry and the specified time.

Figure 19:
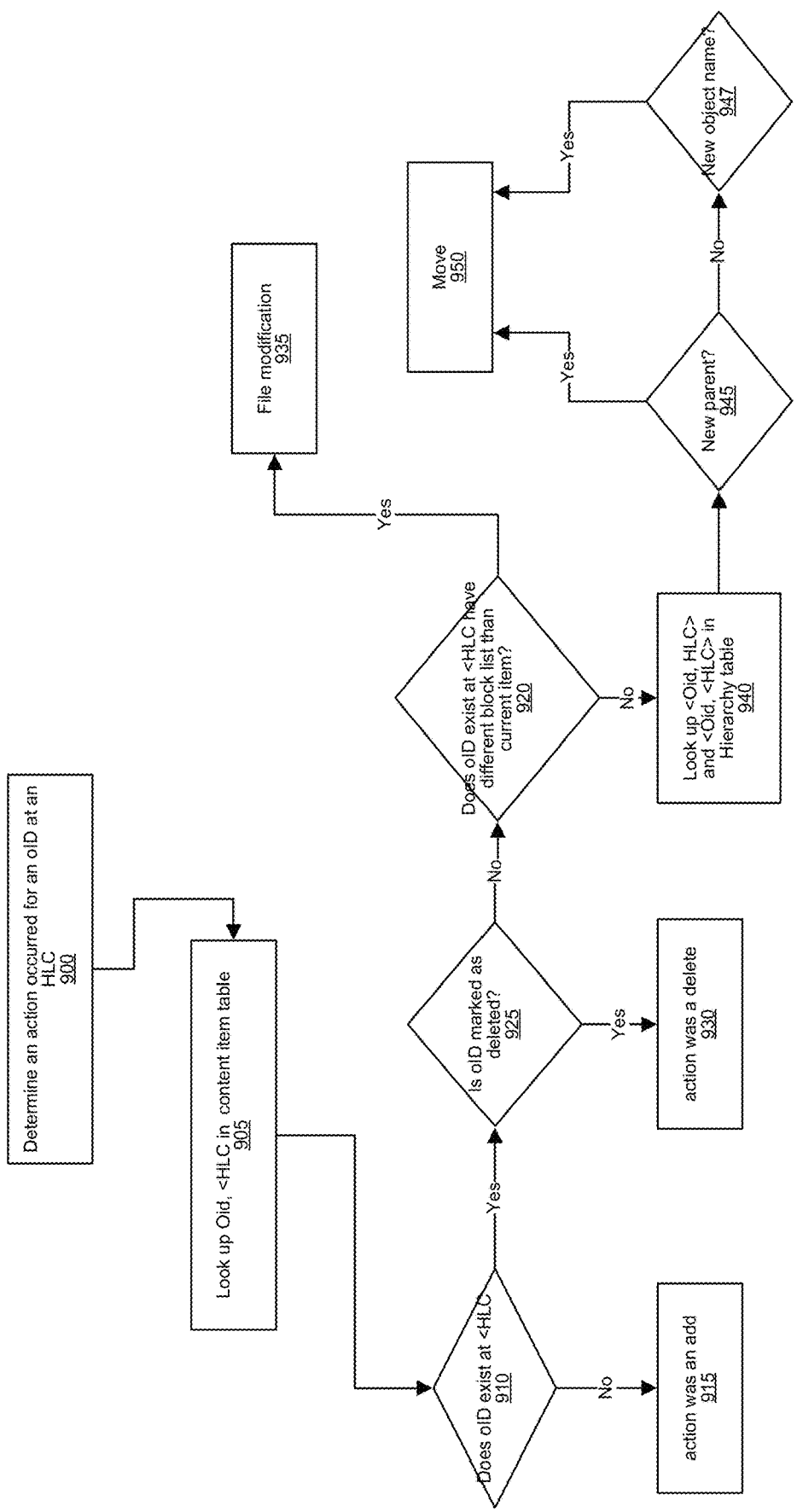
FIG. 19 illustrates an example of determining what type of action to which a row in object change table pertains in accordance with some aspects of the present technology.

FIG. 19 illustrates an example of determining a type of action to which a row in objects database 148 pertains. Although the example method illustrated in FIG. 19 depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As noted above, objects database 148 is configured to be highly efficient and does not include unnecessary data. Objects database 148 includes minimally descriptive data sufficient to provide a source of truth for the content management system, but excludes some useful data when it can be otherwise derived. FIG. 19 provides an example of this principle, though this may not be the only useful data that is not included in objects database 148.

When object change data is received (900) from a client or retrieved (900) from object table 212, object storage service 116 can look up (905) the object using its object ID at any HLC that is less than the time of the current action to determine (910) whether the object ID previously existed in object table 212. If the object ID did not previously exist in object table 212, object storage service 116 can conclude that the current action is to add (915) the object to content management system 110.

If the object ID previously existed (910) in object table 212 than object storage service 116 can determine (925) if the object ID is associated with a tombstone. A tombstone is a notation that explicitly identifies a deleted file. If the object ID is associated with a tombstone, then object storage service 116 can conclude (930) that the action was a delete action.

If the object ID is not associated with a tombstone, object storage service 116 can determine (920) if the action was associated with a different block list than was previously recorded in object table 212.

If the action is associated with a different block list than was previously recorded in the object table 212 then object storage service 116 can conclude (935) that the action was an object modification.

If the action is associated with the same block list as was previously recorded in the object table 212 then object storage service 116 can determine if the object has been moved by looking up (940) the object ID in hierarchy table 222 at the time of the action and a time earlier than the action. If the object ID has a new parent (945) then, object storage service 116 can conclude that the action was a move (950) of the object. Also, if the object ID is associated with a new name (947), object storage service 116 can also interpret (950) this as a move.

While references have been made to actions of merging and sorting, it should be appreciated that these actions can be combined into a merge sort operation.

Figure 20:
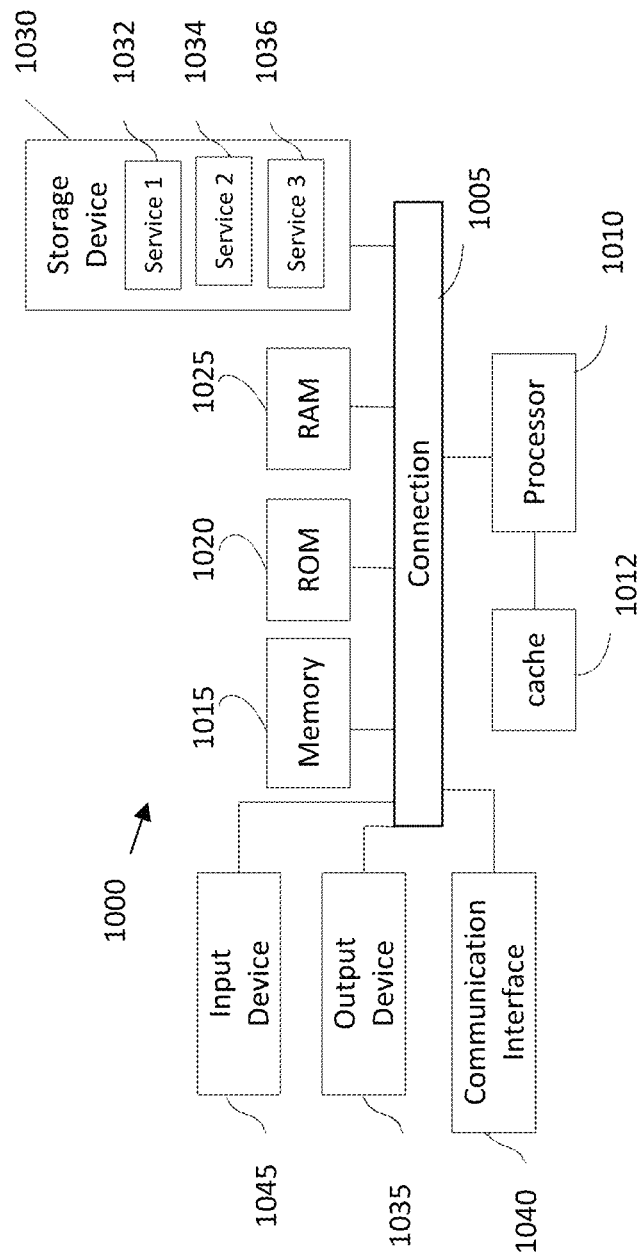
FIG. 20 shows an example of a system for implementing some aspects of the present technology.

FIG. 20 shows an example of computing system 1000, which can be for example any computing device making up client device 150, content management system 110 or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable subject interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a subject to provide multiple types of input/output to communicate with computing system 1000. Computing system 1000 can include communications interface 1040, which can generally govern and manage the subject input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although the example method illustrated herein depict a particular sequence of operations, the sequence may be altered without departing from the scope of the present disclosure. For example, some of the operations depicted may be performed in parallel or in a different. In other examples, different components of an example device or system that implements the methods illustrated herein may perform functions at substantially the same time or in a specific sequence.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
maintaining an aggregates index including fields for an object identifier ("ID") associated with an object included in a directory structure and an aggregate value;
receiving an action on a first object;
creating a new row in the aggregates index, the new row including data for a first object ID of the first object, and a timestamp indicating a time of the action on the first object;
determining the first object has at least one ancestor;
based on the action on the first object, recursively performing the following steps:
determining a next ancestor object of the first object in the new row in the aggregates index by moving up directory structure including the first object;
for each ancestor object, creating a second new row in the aggregates index, the timestamp indicating the time of the action on the first object and identifying the first object as being the object ID on which the action was taken that resulted in the new row being created;
receiving a query identifying at least a second object ID and a time value or time range; and
when the second object ID exists in the aggregates index and is associated with the time value or time range, return at least one of data associated with the aggregate value or data associated with the second object ID from a row associated with the second object ID in the aggregates index.

2. The method of claim 1, wherein each row in the aggregates index includes the aggregated value for aggregated data for all descendants of an object ID that is a subject of the row.

3. The method of claim 2, wherein the aggregates index includes a plurality of immutable rows, whereby any row in the aggregates index represents the aggregated data for the object ID represented in that row during a time period starting at the timestamp represented in that row and ending at a later timestamp represented in another, later written, row for the object ID.

4. The method of claim 2, wherein the aggregated data is an aggregated value for at least one category including a number of bytes occupied by all objects located under the object in the directory structure, or a number of objects under the object in the directory structure.

5. The method of claim 2 comprising:
receiving a request to provide aggregate data from the aggregates index, wherein the request specifies a search object ID and a timestamp value or range;
obtaining the aggregate data for the search object ID and the timestamp from a single row in the aggregates index; and
returning the aggregate data in response to the request.

6. The method of claim 1 comprising:
receiving a request to identify changes made under a search object ID, wherein the request specifies the search object ID and a timestamp value or a timestamp range;
obtaining the object ID on which the action was taken from any row matching the request; and
returning the object ID on which the action was taken at the timestamp value or in the timestamp range.

7. The method of claim 1, wherein the creating the new row in the aggregates index is a synchronous process that is performed in coordination with an update of at least one authoritative table.

8. A non-transitory computer readable medium comprising instructions, the instructions, when executed by a computing system, cause the computing system to:
maintain an aggregates index including fields for an object identifier ("ID") associated with an object included in a directory structure and an aggregate value;
receiving an action on a first object;
create a new row in the aggregates index, the new row including data for a first object ID of the first object, and a timestamp indicating a time of the action on the first object;
determining the first object has at least one ancestor;
based on the action on the first object, recursively perform the following steps:
determine a next ancestor object of the first object in the new row in the aggregates index by moving up directory structure including the first object;
for each ancestor object, create a second new row in the aggregates index, the timestamp indicating the time of the action on the first object and identifying the first object as being the object ID on which the action was taken that resulted in the new row being created;
receive a query identifying at least a second object ID and a time value or time range; and
when the second object ID exists in the aggregates index and is associated with the time value or time range, return at least one of data associated with the aggregate value or data associated with the second object ID from a row associated with the second object ID in the aggregates index.

9. The non-transitory computer readable medium of claim 8, wherein the query is for the aggregated value under the object ID.

10. The non-transitory computer readable medium of claim 8, wherein the instructions further cause the computing system to:
receive, at the aggregates index, a query for aggregated value under the object ID and a time range;
determine that the object ID does not exist in the aggregates index during the time range;
identify the object ID in the aggregates index a most recent time prior to the time range; and
return data from a row in the aggregates index that includes the object ID at the most recent time prior to the time range.

11. The non-transitory computer readable medium of claim 8, wherein the query is to determine whether any change occurred under the object ID during the time range, the instructions further cause the computing system to:
lookup the object ID during the time range in the aggregates index; and
when the data is returned from the aggregates index, send a response to the query indicating that a change has occurred under the object ID during the time range and identifying the object causing the change, when no data is returned from the aggregates index, send a response to the query indicating that no change has occurred under the object ID during the time range.

12. The non-transitory computer readable medium of claim 8, wherein the aggregates index includes a plurality of immutable rows, whereby any row in the aggregates index represents aggregated data for the object ID represented in that row during a time period starting at the timestamp represented in that row and ending at a later timestamp represented in another, later written, row for the object ID.

13. The non-transitory computer readable medium of claim 8, wherein the aggregated data that includes the aggregate value for at least one of a category including a number of bytes occupied by all objects located under the object in the directory structure, or a number of objects under the object in the directory structure.

14. A system comprising:
   at least one processor; and
   at least one computer readable medium storing instructions, wherein when executed by the at least one processor, the instructions are effective cause the system to:
   maintain an aggregates index including fields for an object identifier ("ID") associated with an object included in a directory structure, an aggregate value, and for an action object ID at a timestamp, wherein the action object ID indicates that an action was taken on the object;
   receiving an action on a first object;
   create a new row in the aggregates index, the new row including data for a first action object ID of the first object and a timestamp indicating a time of first action on the first object;
   determining the first object has at least one ancestor;
   based on the action on the first object, recursively performing the following steps:
   determining a next ancestor object of the first object in the new row in the aggregates index by moving up directory structure including the first object;
   for each ancestor object, creating a second new row in the aggregates index, the timestamp indicating the time of the first action on the first object and identifying the first object as being the object ID on which the first action was taken that resulted in the new row being created;
   receive a query identifying at least a second object ID and a time value or time range; and
   when the second object ID exists in the aggregates index and is associated with the time value or the time range, return at least one of data associated with the aggregate value or data associated with the second object ID from a row identified by the second object ID in the aggregates index.

15. The system of claim 14, wherein the aggregates index includes the field for an aggregated value, the aggregated value being descriptive of an aggregation of the data for all descendants of the object ID, and wherein the query is for the aggregated value under the object ID.

16. The system of claim 14, wherein the instructions further cause the system to:
   receive, at the aggregates index, a query for the aggregated value under the object ID and a time range;
   determine that the object ID does not exist in the aggregates index during the time range;
   identify the object ID in the aggregates index a most recent time prior to the time range; and
   return data from the row in the aggregates index include the object ID at the most recent time prior to the time range.

17. The system of claim 14, wherein the query is to determine whether any change occurred under the object ID during the time range, the instructions further cause the system to:
   lookup the object ID during the time range in the aggregates index; and
   when the data is returned from the aggregates index, send a response to the query indicating that a change has occurred under the object ID during the time range and identifying the action object ID causing the change.

18. The system of claim 14, wherein the query is to determine whether any change occurred under the object ID during the time range, the instructions further cause the system to:
   lookup the object ID during the time range in the aggregates index; and
   when no data is returned from the aggregates index, send a response to the query indicating that no change has occurred under the object ID during the time range.

* * * * *

UNITED STATES PATENT AND TRADEMARK OFFICE
CERTIFICATE OF CORRECTION

PATENT NO. : 12,174,814 B2
APPLICATION NO. : 17/129292
DATED : December 24, 2024
INVENTOR(S) : Aaron Passey, Braden Walker and Akos Albert It is certified that error appears in the above-identified patent and that said Letters Patent is hereby corrected as shown below:

In the Claims

In Claim 16, Column 42, Lines 12-13:
"receive, at the aggregates index, a query for the aggregated value under the object ID and a time range;"
Should be corrected to:
"receive, at the aggregates index, a query for the aggregate value under the object ID and a time range;"

Signed and Sealed this
Ninth Day of September, 2025

Coke Morgan Stewart
*Acting Director of the United States Patent and Trademark Office*